(12) United States Patent
Kishikawa et al.

(10) Patent No.: US 12,003,521 B2
(45) Date of Patent: Jun. 4, 2024

(54) ANOMALY DETECTION METHOD AND ANOMALY DETECTION DEVICE

(71) Applicant: Panasonic Intellectual Property Corporation of America, Torrance, CA (US)

(72) Inventors: Takeshi Kishikawa, Osaka (JP); Yoshihiro Ujiie, Osaka (JP); Ryo Hirano, Osaka (JP); Tohru Wakabayashi, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 764 days.

(21) Appl. No.: 17/082,431

(22) Filed: Oct. 28, 2020

(65) Prior Publication Data
US 2021/0044610 A1 Feb. 11, 2021

Related U.S. Application Data

(63) Continuation of application No. PCT/JP2019/029251, filed on Jul. 25, 2019.

(30) Foreign Application Priority Data

Jul. 27, 2018 (WO) ............... PCT/JP2018/028290

(51) Int. Cl.
*G06F 21/00* (2013.01)
*H04L 9/40* (2022.01)

(52) U.S. Cl.
CPC .......... *H04L 63/1425* (2013.01); *H04L 63/20* (2013.01)

(58) Field of Classification Search
CPC ............... G06F 9/5011; G06F 9/5083; G06F 2209/5019; G06F 9/5027; G06N 20/00; G06N 3/044; G06N 3/045; G06N 3/08
See application file for complete search history.

(56) References Cited

U.S. PATENT DOCUMENTS 6,292,589 B1 * 9/2001 Chow ................. H04N 19/176
382/250
9,734,037 B1 * 8/2017 McCorkendale ... G06F 11/3409
(Continued)

FOREIGN PATENT DOCUMENTS

| JP | 2009-38477 | 2/2009 |
|---|---|---|
| JP | 2011-193373 | 9/2011 |

(Continued)

OTHER PUBLICATIONS

International Search Report dated Aug. 20, 2019 in International (PCT) Application No. PCT/JP2019/029251.
(Continued)

Primary Examiner — Don G Zhao
(74) Attorney, Agent, or Firm — Wenderoth, Lind & Ponack, L.L.P.

(57) ABSTRACT

An anomaly detection device included in a communication network adopting a time-triggered protocol based on a time slot includes: a frame transceiver that receives frames; and an anomaly detector that detects an occurrence of an anomalous frame in accordance with a time slot among a plurality of time slots included in a cycle and the number of repeated cycles of the cycle for each frame. The anomaly detector detects an occurrence of an anomalous frame by verifying a statistic on the frames received while the cycle is repeated a predetermined number of times, which is at least once, against a rule indicating a reference range of the statistic.

9 Claims, 16 Drawing Sheets

(56) References Cited

U.S. PATENT DOCUMENTS

| | | | |
|---|---|---|---|
| 10,326,788 B1* | 6/2019 | Bajpai | H04S 63/1416 |
| 2003/0191857 A1* | 10/2003 | Terrell | H04L 45/30 |
| | | | 709/244 |
| 2004/0008652 A1* | 1/2004 | Tanzella | H04L 63/1425 |
| | | | 370/469 |
| 2004/0098610 A1* | 5/2004 | Hrastar | H04L 63/1433 |
| | | | 726/1 |
| 2004/0157624 A1* | 8/2004 | Hrastar | H04L 41/0893 |
| | | | 455/456.1 |
| 2004/0203764 A1* | 10/2004 | Hrastar | H04L 41/0893 |
| | | | 455/552.1 |
| 2004/0218602 A1* | 11/2004 | Hrastar | H04L 67/125 |
| | | | 370/390 |
| 2005/0174961 A1* | 8/2005 | Hrastar | H04W 12/126 |
| | | | 370/328 |
| 2005/0246353 A1* | 11/2005 | Ezer | G06F 40/186 |
| 2006/0123133 A1* | 6/2006 | Hrastar | H04L 63/1491 |
| | | | 709/240 |
| 2009/0034421 A1 | 2/2009 | Kodama et al. | |
| 2010/0171642 A1* | 7/2010 | Hassan | G01S 13/825 |
| | | | 340/992 |
| 2012/0209941 A1* | 8/2012 | Yamamoto | H04L 43/026 |
| | | | 709/212 |
| 2014/0328352 A1 | 11/2014 | Mabuchi et al. | |
| 2015/0355917 A1* | 12/2015 | Tsujimura | H04L 12/40006 |
| | | | 710/104 |
| 2017/0093866 A1* | 3/2017 | Ben-Noon | H04W 12/068 |
| 2018/0026999 A1* | 1/2018 | Ruvio | H04L 41/0631 |
| | | | 726/23 |
| 2018/0131712 A1* | 5/2018 | Cornelio | H04L 63/14 |
| 2018/0189103 A1* | 7/2018 | Teshler | G06F 21/53 |
| 2019/0116157 A1 | 4/2019 | Kishikawa et al. | |
| 2019/0331555 A1* | 10/2019 | Schat | G01M 15/02 |
| 2019/0385057 A1* | 12/2019 | Litichever | H04L 63/14 |
| 2020/0015075 A1* | 1/2020 | Takatsuka | H04L 12/28 |

FOREIGN PATENT DOCUMENTS

| | | | | |
|---|---|---|---|---|
| JP | 5664799 | 2/2015 | | |
| JP | 6279174 | 2/2018 | | |
| WO | WO-2016151566 A1 * | 9/2016 | | G06F 21/554 |
| WO | 2018/105330 | 6/2018 | | |

OTHER PUBLICATIONS

International Search Report dated Oct. 9, 2018 in International (PCT) Application No. PCT/JP2018/028290.

* cited by examiner

FIG. 7

| PARAMETER | VALUE |
|---|---|
| TRANSFER SPEED | 10 Mbps |
| SLOT ID OF STATIC SEGMENT | 1-50 |
| SLOT ID OF DYNAMIC SEGMENT | 51-100 |
| PAYLOAD LENGTH OF STATIC SLOT | 8 |
| ⋮ | ⋮ |

FIG. 8

| SLOT ID | CYCLE OFFSET | CYCLE RECEPTION | FRAME NAME | PAYLOAD INFORMATION |
|---|---|---|---|---|
| 1 | 0 | 1 | A | SPEED |
| 2 | | | | |
| 3 | 0 | 2 | B | STEERING ANGLE |
| ⋮ | | | | |
| 98 | 1 | 2 | C | GEAR STATUS |
| 99 | 0 | 4 | D | CAMERA INFORMATION 1 |
| | 1 | 4 | E | CAMERA INFORMATION 2 |
| | 2 | 4 | F | CAMERA INFORMATION 3 |
| | 3 | 4 | G | CAMERA INFORMATION 4 |
| 100 | 0 | 4 | H | DOOR STATUS |

FIG. 9

| CYCLE | SLOT ID | | | | | | |
|---|---|---|---|---|---|---|---|
| | | 1 | 2 | 3 | ... | 98 | 99 | 100 |
| | 0 | A | | B | ... | | D | H |
| | 1 | A | | | | C | E | |
| | 2 | A | | B | | | F | |
| | ⋮ | | | | | | | |
| | 61 | A | | | | C | E | |
| | 62 | A | | B | ... | | F | |
| | 63 | A | | | | C | G | |

FIG. 10

| FRAME NAME | MESSAGE ID | PAYLOAD LENGTH | RECEPTION RULE |
|---|---|---|---|
| A | — | 8 | SPEED Δ < 0.5 km/h |
| B | — | 8 | Δ < 30° |
| C | — | 16 | STOPPED / MOVING |
| D | — | 32 | STOPPED |
| E | — | 32 | STOPPED / MOVING |
| F | 0x0001 | 32 | STOPPED |
| | 0x0002 | 32 | STOPPED / MOVING |
| | 0x0004 | 32 | MOVING |
| G | — | 32 | STOPPED / MOVING |
| H | — | 2 | STOPPED |

FIG. 11

| CYCLE | NUMBER OF DYNAMIC FRAMES | STARTUP FRAME | SYNC FRAME | PAYLOAD PREAMBLE | NULL FRAME | ERROR |
|---|---|---|---|---|---|---|
| 0 | <20 | <2 | <2 | <5 | <4 | <5 |
| 1 | <18 | <2 | <2 | <6 | <4 | <5 |
| 2 | <20 | <2 | <2 | <4 | <4 | <5 |
| ... | | | | | | |
| 61 | <18 | <2 | <2 | <5 | <4 | <5 |
| 62 | <24 | <2 | <2 | <6 | <4 | <5 |
| 63 | <20 | <2 | <3 | <4 | <4 | <5 |

FIG. 12

| FRAME NAME | NUMBER OF RECEPTIONS | STARTUP FRAME | SYNC FRAME | PAYLOAD PREAMBLE | NULL FRAME | ERROR |
|---|---|---|---|---|---|---|
| A | 64 | <3 | 64 | 0 | <3 | <3 |
| B | 32 | 0 | 0 | 0 | <3 | <3 |
| C | ≤32 | 0 | 0 | 0 | <3 | <3 |
| D | ≤16 | 0 | 0 | 0 | <3 | <3 |
| E | ≤16 | 0 | 0 | 0 | <3 | <3 |
| F | ≤16 | 0 | 0 | ≤16 | <3 | <3 |
| G | ≤16 | 0 | 0 | 0 | <3 | <3 |
| H | ≤8 | 0 | 0 | 0 | <3 | <3 |

FIG. 13A

| FRAME NAME | RECEPTION VALUE | RECEPTION TIME (μs) |
|---|---|---|
| A | 40.5 km/h | 12100 |
| B | 5° | 8140 |
| C | D | 12400 |
| D | DETECTION OF VEHICLE AHEAD | 1440 |
| E | DETECTION OF PEDESTRIAN | 5480 |
| F | DETECTION OF LANE | 9520 |
| G | REAR CAMERA IN INACTIVE STATE | 13560 |
| H | ALL CLOSED | 1600 |
| VEHICLE STATUS | MOVING | |

FIG. 13B

| CYCLE | NUMBER OF DYNAMIC FRAMES | STARTUP FRAME | SYNC FRAME | PAYLOAD PREAMBLE | NULL FRAME | ERROR |
|---|---|---|---|---|---|---|
| 0 | 10 | 0 | 1 | 0 | 0 | 1 |
| 1 | 11 | 0 | 1 | 0 | 0 | 1 |
| 2 | 10 | 0 | 1 | 1 | 0 | 1 |
| 3 | 12 | 0 | 1 | 1 | 0 | 1 |
| ... | | | | | | |
| 61 | 10 | 0 | 1 | 1 | 0 | 1 |
| 62 | 12 | 0 | 1 | 1 | 0 | 1 |
| 63 | 10 | 0 | 1 | 1 | 0 | 1 |

FIG. 13C

| FRAME NAME | NUMBER OF RECEPTIONS | STARTUP FRAME | SYNC FRAME | PAYLOAD PREAMBLE | NULL FRAME | ERROR |
|---|---|---|---|---|---|---|
| A | 64 | 0 | 64 | 0 | 0 | 0 |
| B | 32 | 0 | 0 | 0 | 0 | 15 |
| C | 32 | 0 | 0 | 0 | 0 | 0 |
| D | 16 | 0 | 0 | 0 | 0 | 0 |
| E | 16 | 0 | 0 | 0 | 0 | 0 |
| F | 16 | 0 | 0 | 16 | 0 | 0 |
| G | 16 | 0 | 0 | 0 | 0 | 0 |
| H | 8 | 0 | 0 | 0 | 0 | 0 |

FIG. 13D

| FRAME NAME | MESSAGE ID | NUMBER OF RECEPTIONS |
|---|---|---|
| C | — | 32 |
| D | — | 16 |
| E | — | 16 |
| F | 0x0001 | 8 |
| F | 0x0002 | 4 |
| F | 0x0004 | 4 |
| G | — | 16 |
| H | — | 8 |

ANOMALY DETECTION METHOD AND ANOMALY DETECTION DEVICE

CROSS REFERENCE TO RELATED APPLICATIONS

This application is a U.S. continuation application of PCT International Patent Application Number PCT/JP2019/029251 filed on Jul. 25, 2019, claiming the benefit of priority of PCT International Patent Application Number PCT/JP2018/028290 filed on Jul. 27, 2018, the entire contents of which are hereby incorporated by reference.

BACKGROUND

1. Technical Field

The present disclosure relates to a technology of detecting an occurrence of an anomalous frame in a communication network.

2. Description of the Related Art

In recent years, an in-vehicle system of an automobile includes multiple devices called electronic control units (hereinafter, referred to as ECUs). A communication network that connects these ECUs is called an in-vehicle network. Many standards have been developed for such an in-vehicle network. Although one of the current most leading standards is a Controller Area Network (hereinafter, referred to as CAN [registered trademark]), FlexRay (registered trademark) is designed as a protocol faster and more reliable than CAN.

FlexRay expresses a value "0" and a value "1" on the basis of a voltage difference between two wires, which are a twisted pair. ECUs connected to a bus are called nodes. Each of the nodes connected to the bus transmits and receives messages called frames, similarly to CAN. In contrast to the event-triggered communication protocol adopted in CAN, FlexRay adopts Time Division Multiple Access (hereinafter, referred to as TDMA) that is a time-triggered protocol. In a FlexRay in-vehicle network, frames are transmitted at predetermined timings in a predetermined order.

Meanwhile, a CAN in-vehicle network has a security threat that an attacker accesses the bus and transmits an anomalous frame to falsely control an ECU. Security measures against such a threat are now under study.

For example, Japanese Patent No. 5664799 (hereinafter, referred to as Patent Literature (PTL) 1) proposes an in-vehicle network monitoring device that detects whether a frame is transmitted to a bus at predetermined communication intervals. A method disclosed in PTL 1 determines a frame transmitted regardless of the predetermined communication intervals to be anomalous, and thereby prevents control performed using an anomalous frame.

Unfortunately, the anomaly detection method disclosed in PTL 1 cannot be applied to the FlexRay in-vehicle network, in which communications at the predetermined communication intervals allow a frame having a specific identifier (ID) to be received at constant intervals.

To solve the above issue, the present disclosure has an object to implement a safer communication network system by providing an anomaly detection device and an anomaly detection method capable of detecting an occurrence of an anomalous frame even in a communication network adopting a time-triggered protocol.

SUMMARY

According to an aspect of the present disclosure, there is provided an anomaly detection device included in a communication network adopting a time-triggered protocol based on a time slot, the communication network including a plurality of communication devices that connect to each other, each of the plurality of communication devices transmitting or receiving one or more frames for each predetermined time slot among a plurality of time slots included in a plurality of cycles including a predetermined cycle, the anomaly detection device including: a frame receiver that receives the one or more frames; and an anomaly detector that detects an occurrence of an anomalous frame in accordance with a number of repeated cycles of each cycle in the plurality of cycles and the each predetermined time slot in which each of the one or more frames is received by the frame receiver, wherein the anomaly detector performs the detection by verifying a statistic on the one or more frames against a rule indicating a reference range of the statistic, the one or more frames being received in at least one cycle including the predetermined cycle.

According to another aspect of the present disclosure, there is provided an anomaly detection method executed in a communication network adopting a time-triggered protocol based on a time slot, the communication network including a plurality of communication devices that connect to each other, each of the plurality of communication devices transmitting or receiving one of more frames for each predetermined time slot among a plurality of time slots included in a plurality of cycles including a predetermined cycle, the anomaly detection method including: receiving the one or more frames; and detecting an occurrence of an anomalous frame in accordance with a number of repeated cycles of each cycle in the plurality of cycles and the each predetermined time slot in which each of the one or more frames is received in the receiving, wherein the detecting is performed by verifying a statistic on the one or more frames against a rule indicating a reference range of the statistic, the one or more frames being received in at least one cycle including the predetermined cycle.

The general and specific aspects according to the above-described embodiments may be implemented to a system, a method, an integrated circuit, a computer program, or a computer-readable recording medium such as a Compact Disc-Read Only Memory (CD-ROM), or may be any combination of them.

The present disclosure enables detection of an occurrence of an anomalous frame even in a communication network adopting a time-triggered protocol and thereby implements a safer in-vehicle network system.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 7 illustrates an example of communication setting parameters according to Embodiment.

FIG. 8 illustrates an example of an authorized-ID list according to Embodiment.

FIG. 9 illustrates an example of a transmission-reception schedule based on the authorized-ID list according to Embodiment.

FIG. 10 illustrates an example of individual frame rules according to Embodiment.

FIG. 11 illustrates an example of cycle-specific rules according to Embodiment.

FIG. 12 illustrates an example of frame type-specific rules according to Embodiment.

FIG. 13A illustrates an example of a vehicle status and a reception value for each type according to frame content included in a reception history, according to Embodiment.

FIG. 13B illustrates an example of statistics for each cycle included in the reception history, according to Embodiment.

FIG. 13C illustrates an example of statistics on all cycles for each type according to frame content included in the reception history, according to Embodiment.

FIG. 13D illustrates an example of statistics for each message ID of dynamic frames included in the reception history, according to Embodiment.

DETAILED DESCRIPTION OF THE EMBODIMENTS

Figure 1:
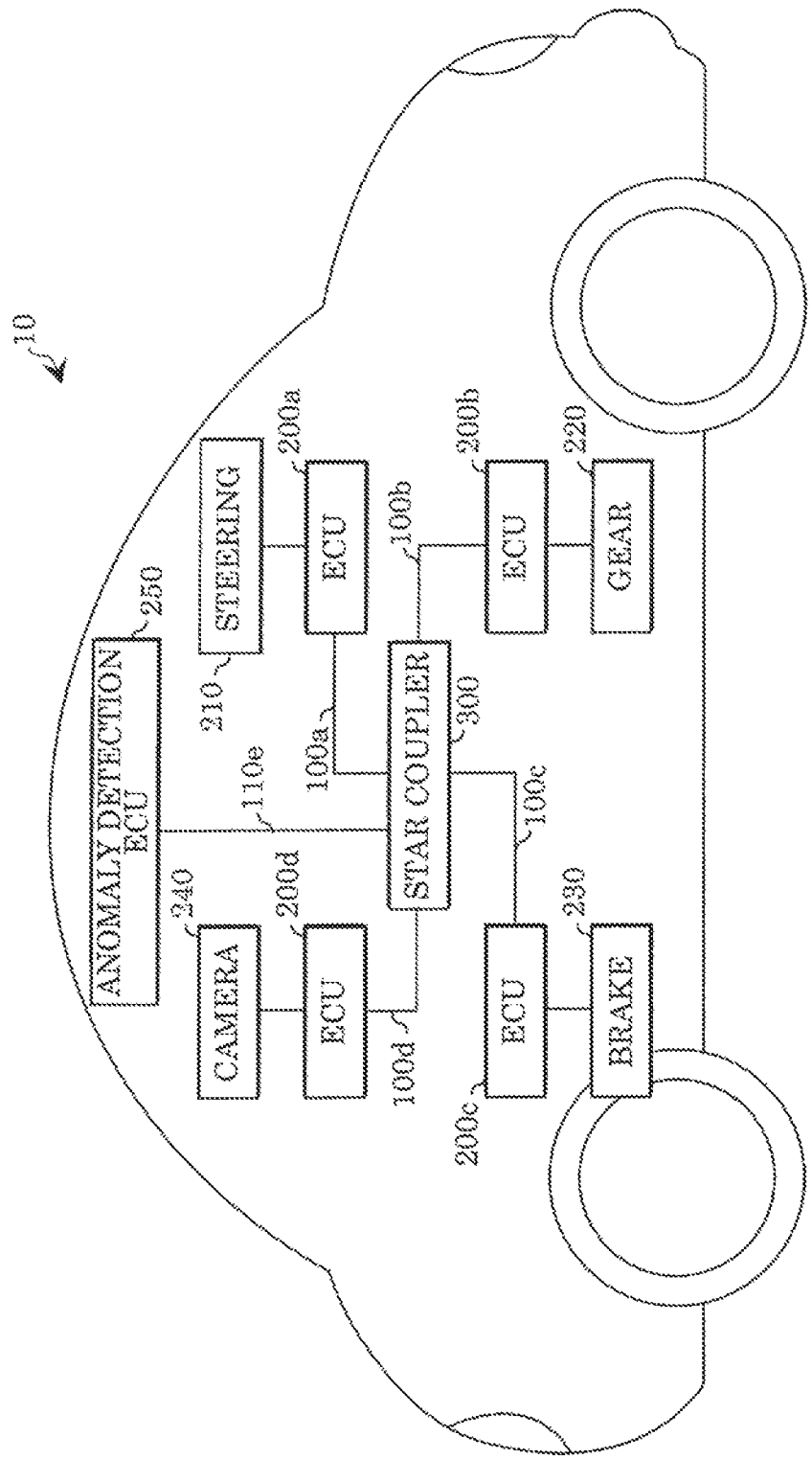
FIG. 1 is a block diagram illustrating an example of an overall configuration of an in-vehicle network system according to Embodiment.

According to an aspect of the present disclosure, there is provided an anomaly detection device included in a communication network adopting a time-triggered protocol based on a time slot, the communication network including a plurality of communication devices that connect to each other, each of the plurality of communication devices transmitting or receiving one or more frames for each predetermined time slot among a plurality of time slots included in a plurality of cycles including a predetermined cycle, the anomaly detection device including: a frame receiver that receives the one or more frames; and an anomaly detector that detects an occurrence of an anomalous frame in accordance with a number of repeated cycles of each cycle in the plurality of cycles and the each predetermined time slot in which each of the one or more frames is received by the frame receiver, wherein the anomaly detector performs the detection by verifying a statistic on the one or more frames against a rule indicating a reference range of the statistic, the one or more frames being received in at least one cycle including the predetermined cycle.

This enables the use of the rule that is based not only on the ID indicating the type of the frame but also on the number of repetitions of the cycle including the time slots. For example, even an anomalous frame that is difficult to detect only by observing the frame alone can be detected and handled by monitoring the cycle-based statistics collected for a predetermined period of time.

It is possible that each of the one or more frames is classified according to a first type included the frame, the first type indicates a type according to meta information of the frame, the statistic includes a first statistic on a total number of each type of frames classified according to the first type, in the predetermined cycle, and the anomaly detector detects an occurrence of an anomalous frame by verifying the first statistic against a first rule, as the rule, indicating a reference range of the first statistic.

This enables the cycle-based detection of the occurrence of the anomalous frame.

It is also possible that each of the one or more frames is classified according to a second types included the frame, the second type indicates content of a payload of the frame, the statistic includes a second statistic on at least one of: a total number of each type of frames classified according to the second type, in two or more cycles that include the predetermined cycle; and a total number of each type of frames classified according to the first type and the second type, in two or more cycles that include the predetermined cycle, and the anomaly detector detects an occurrence of an anomalous frame by verifying the second statistic against a second rule, as the rule, indicating a reference range of the second statistic.

This allows the occurrence of the anomalous frame to be detected in accordance with the type according to the content of the frame.

It is further possible that when detecting an occurrence of an anomalous frame using one of the first rule and the second rule, the anomaly detector further determines, using an other of the first rule and the second rule, whether the anomalous frame has occurred.

This enables the cycle-based detection or the detection for identifying the source in accordance with the frame-content type to be performed depending on circumstances, for example. Moreover, both of these detection methods may be used for verifying the source of the anomalous frame, so that high-accuracy detection can be achieved.

It is still further possible that when detecting an occurrence of an anomalous frame, the anomaly detector further determines, for each of the one or more frames received, whether the frame is anomalous.

This can reduce the processing load of the anomaly detection device that receives frames at a communication speed faster than ever before. Moreover, after the detection of the occurrence of the anomalous frame, a more detailed anomaly detection process is performed so that the safety of the in-vehicle network can be enhanced.

It is still further possible that, for each of the one or more frames, when (i) the time slot in which the frame is received is the predetermined time slot in the cycle and (ii) a relationship, in which a remainder is 0 if a value obtained by subtracting a predetermined offset value from a value of the number of repeated cycles of the cycle in which the frame is transmitted is divided by a predetermined cycle reception, is not satisfied, the anomaly detector determines that the frame is anomalous.

Thus, the frames having the same content are extracted from among the frames transmitted by the cycle multiplexing in the cycle repetition. Then, by verifying the extracted frames against the transmission-reception schedule, an anomalous frame can be detected from among the extracted frames.

It is still further possible that the plurality of time slots included in the plurality of cycles include a dynamic time slot in which a frame is transmitted or received as needed for each of the plurality of cycles, and the anomaly detector determines whether a dynamic frame received in the dynamic time slot is anomalous, in accordance with: a vehicle status determined from a frame received before the dynamic frame is received; and information included in the dynamic frame.

This allows the rule (condition) under which the frame is transmitted or received in the dynamic time slot to be defined according to the vehicle status, such as a moving state. If the vehicle status detected when the dynamic frame is received in the dynamic time slot does not match this rule, this frame is detected as an anomalous frame.

It is still further possible that if the vehicle status is not a predetermined status when the dynamic frame including a number of repeated cycles satisfying a predetermined relationship with a slot identification (ID) of the dynamic frame is received, the anomaly detector determines that the dynamic frame is anomalous.

Thus, the dynamic frame determined, from the vehicle status, to be transmitted at a wrong timing is detected as an anomalous frame.

It is still further possible that the time-triggered protocol is a FlexRay (registered trademark) communication protocol, the number of repeated cycles refers to a cycle count defined in the FlexRay communication protocol, and the first statistic includes at least one of: a total number of the one or more frames received; a total number of one or more null frames received; a total number of one or more sync frames received; a total number of one or more startup frames received; a total number of one or more frames each having a payload preamble indicator indicating 1; and a total number of one or more frames received each having an error.

This allows an anomalous frame to be detected even when the cycle multiplexing based on the FlexRay protocol is used. Then, monitoring the statistics on, for example, the attribute of the frame can detect injection of an anomalous frame.

According to another aspect of the present disclosure, there is provided an anomaly detection method executed in a communication network adopting a time-triggered protocol based on a time slot, the communication network including a plurality of communication devices that connect to each other, each of the plurality of communication devices transmitting or receiving one of more frames for each predetermined time slot among a plurality of time slots included in a plurality of cycles including a predetermined cycle, the anomaly detection method including: receiving the one or more frames; and detecting an occurrence of an anomalous frame in accordance with a number of repeated cycles of each cycle in the plurality of cycles and the each predetermined time slot in which each of the one or more frames is received in the receiving, wherein the detecting is performed by verifying a statistic on the one or more frames against a rule indicating a reference range of the statistic, the one or more frames being received in at least one cycle including the predetermined cycle.

This enables the use of the rule that is based not only on the ID indicating the type of the frame but also on the number of repetitions of the cycle including the time slots. For example, even an anomalous frame that is difficult to detect only by observing the frame alone can be detected and handled by monitoring the cycle-based statistics collected for a predetermined period of time.

The following describes the anomaly detection devices according to the embodiments of the present disclosure with reference to the Drawings. The embodiments below are general or specific examples. The numerical values, elements, arrangement and connection configuration of the elements, steps, the order of the steps, etc., described in the following embodiments are merely examples, and are not intended to limit the present disclosure. Note that the respective figures are schematic diagrams and are not necessarily precise illustrations.

Embodiment

[1. System Configuration]

The present embodiment describes an in-vehicle network system as an example of a communication network system, and an anomaly detection ECU as an example of an anomaly detection device included in the in-vehicle network system in Embodiment according to the present disclosure, with reference to the drawings.

FIG. 1 is a block diagram illustrating an example of an overall configuration of in-vehicle network system 10 according to the present disclosure. In-vehicle network system 10 includes: buses 100a, 100b, 100c, 100d, and 100e used for communications established under a FlexRay protocol; ECUs 200a, 200b, 200c, and 200d and anomaly detection ECU 250 each connected to a corresponding one of the aforementioned buses; steering 210, gear 220, brake 230, and camera 240 each controlled by a corresponding one of the aforementioned ECUs; and star coupler 300 that connects the aforementioned buses to each other. ECUs 200a to 200d control a vehicle by transmitting and receiving frames via buses 100a to 100e. Anomaly detection ECU 250 observes buses 100a to 100e to detect an occurrence of an anomalous frame. In the present embodiment, each of ECUs 200a to 200d is an example of a communication device, and anomaly detection ECU 250 is an example of an anomaly detection device. Star coupler 300 performs signal shaping and the ECUs are synchronized with each other via buses 100a to 100e so that the same signal passes through buses 100a to 100e. Each of the buses and ECUs connected to the buses is also referred to as a branch in the present disclosure.

[1.2 FlexRay Cycle]

For FlexRay communications, a periodic operation called a cycle that includes four segments is repeated. Each of the nodes included in one whole FlexRay network, also called a cluster, achieves synchronous communications by calculating and correcting a difference between its unique local time and a global time indicating a time duration and start time of the cycle.

Figure 2:
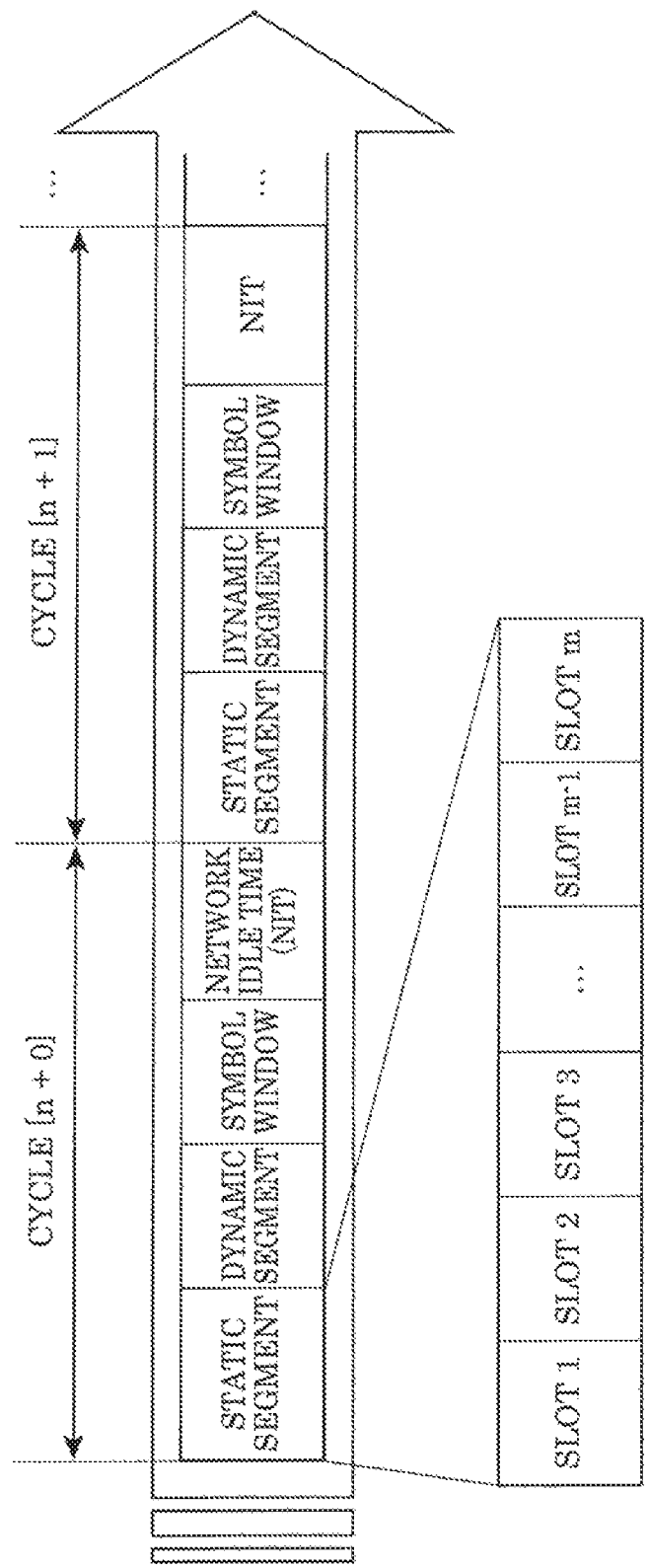
FIG. 2 illustrates a FlexRay cycle according to Embodiment.

FIG. 2 illustrates a FlexRay communication cycle. FlexRay communications are achieved by repetition of this cycle. Each of the nodes stores a cycle count (the number of repeated cycles) in synchronization. A value of the cycle count, "n+0" and "n+1" in FIG. 2, is incremented by one at a time from 0 to 63. When 63 is reached, the cycle count is reset to 0.

One cycle includes four segments, which are a static segment, a dynamic segment, a symbol window, and a network idle time (NIT). Time durations of these segments are predetermined by parameters in one cluster, and thus all cycles in one cluster have the same time duration. Note that the dynamic segment and the symbol window are optional. The node transmits frames in the static segment and in the dynamic segment. Each of the static segment and the dynamic segment has a fixed time unit called a time slot or a slot, during which one frame is allowed to be transmitted.

The static segment includes a plurality of slots. Each cycle starts with the static segment. All the static segments in one cluster have the same number of slots, and all the slots in one cluster have the same duration. Each of the slots is assigned a number (a slot number) that is one greater than the number of the previous slot in sequence. A frame transmitted in the slot is assigned this slot number as a frame identifier hereinafter, also referred to as a frame ID. A slot in the static segment is also referred to as a static slot or a static time slot. A frame transmitted in the static segment is also referred to as a static frame. A predetermined ECU always transmits a frame in the static slot in a predetermined cycle. All static frames in one cluster have the same payload length.

The dynamic segment includes slots called minislots, and is placed after the static segment in each cycle. Note that the dynamic segment is not essential as described above. As with the slots in the static segment, each of the minislots is also assigned a number (a slot number) that is one greater than the number of the previous minislot in sequence. Although a timing (minislot) of transmitting a frame is predetermined for each of the ECUs, the ECU does not need to transmit a frame in each predetermined cycle unlike in the static segment. A slot in the dynamic segment is also referred to as a dynamic slot or a dynamic time slot. A frame transmitted in the dynamic segment is also referred to as a dynamic frame. A payload length of a dynamic frame can be any value from 0 to 254. To be more specific, the length of the dynamic slot is variable.

The symbol window is a time period in which a signal called a symbol is transmitted and received.

The network idle time is a communication-free period, and is always provided at the end of the cycle. In the network idle time, the ECU performs no data transmission and performs, for example, a synchronous process. Thus, the network is literally in an idle state.

The FlexRay protocol uses no identifier indicating a transmission destination or transmission source. A transmitter node transmits a frame containing predetermined content to the bus at a transmission timing (slot) predetermined as described above. A receiver node receives the frame from the bus only at a predetermined reception timing (slot). Moreover, a method called "cycle multiplexing" is also used to achieve communications of frames having different contents in different cycles even in the slots having the same number in the static or dynamic segment.

Furthermore, the FlexRay protocol enables the design of a communication network based on not only a bus network topology in which all nodes are connected to a single bus as in CAN, but also a star network topology achieved via a star coupler or a hybrid network topology that is a combination of the bus and star topologies.

[1.3 Frame Format]

Figure 3:
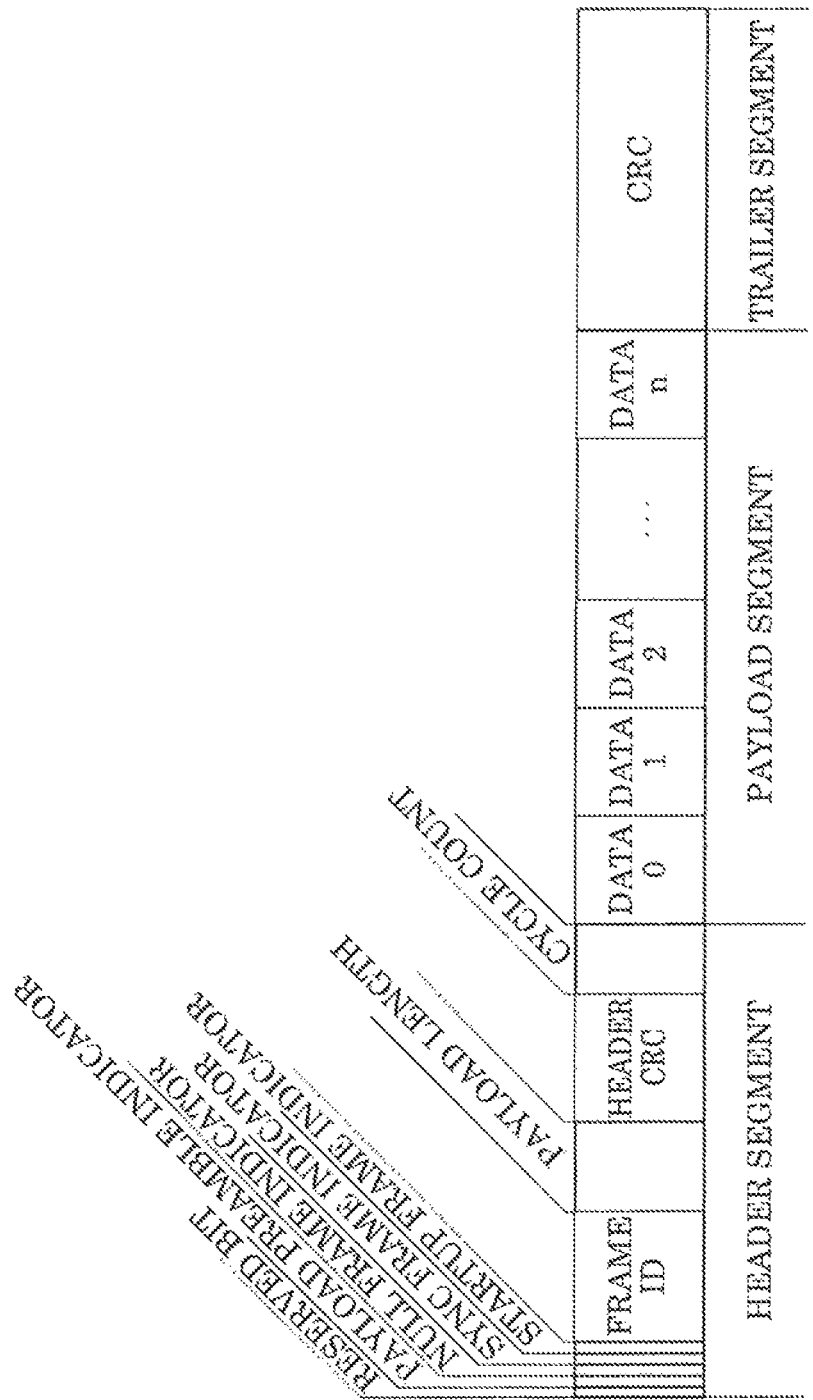
FIG. 3 illustrates a FlexRay frame format according to Embodiment.

FIG. 3 illustrates a frame format based on the FlexRay protocol. This format is shared by both the static frame and the dynamic frame. The frame includes three segments, which are a header segment, a payload segment, and a trailer segment. In the present disclosure, these segments may also be referred to as the header, the payload, and the trailer.

The header segment starts with a reserved bit, which is followed by, as meta information about an attribute (type) of the frame, a payload preamble indicator, a null frame indicator, a sync frame indicator, and a startup frame indicator each having one bit. After this, a frame ID having 11 bits, a payload length having 7 bits, and a header CRC having 11 bits follow. At the end, a cycle count having 6 bits is included.

The frame ID matches the slot number described above and thus also referred to as the slot ID. The frame ID is used to identify the transmission timing of the frame in the static or dynamic segment and the frame type based on the content of the frame.

The payload length indicates a length of the payload of the frame, and is up to 127. The payload segment stores data corresponding to the number of bytes obtained by multiplying the value of the payload length by 2.

The header CRC is a cyclic redundancy check (CRC) calculated using the values in the fields from the sync frame indicator to the payload length.

The cycle count stores a value, from 0 to 63, indicating the number of the current cycle in repeated cycles in the cluster.

The payload segment includes a data body of the frame and contains up to 254 bytes.

The trailer segment stores a CRC calculated using the values of the fields including the header and the whole payload.

[1.4 Configuration of ECU (Other than Anomaly Detection ECU)]

Figure 4:
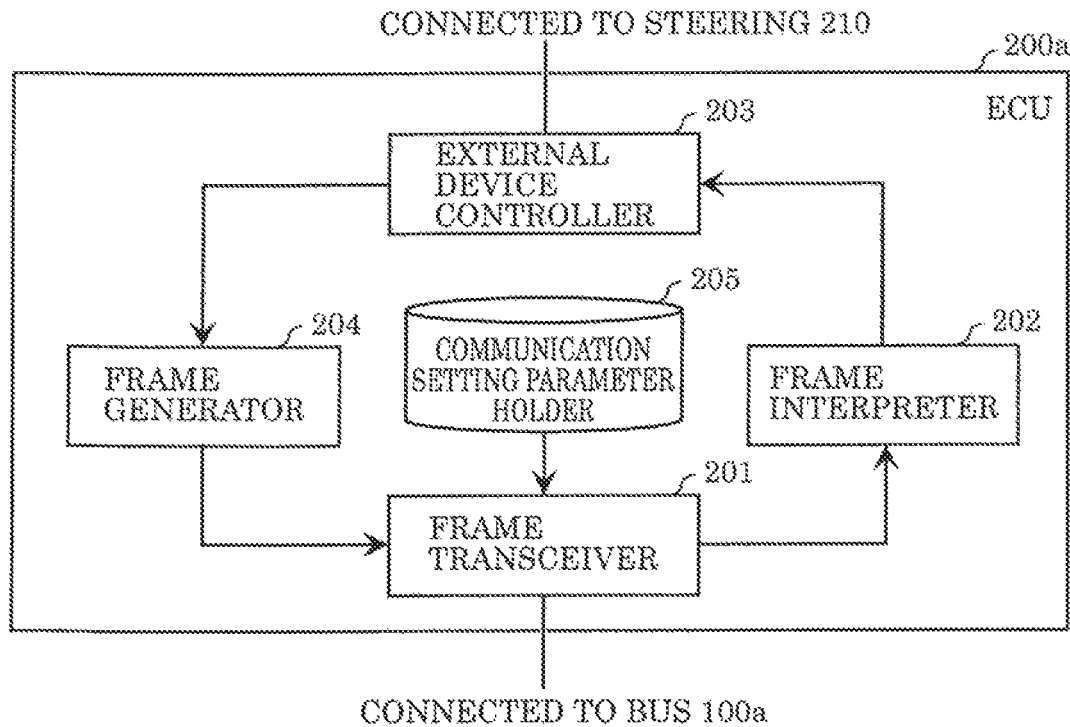
FIG. 4 is a block diagram illustrating an example of a functional configuration of an ECU according to Embodiment.

FIG. 4 is a block diagram illustrating an example of a functional configuration of ECU 200a. Here, ECU 200b, ECU 200c, and ECU 200d may also have the same configuration as that of ECU 200a, and thus description on ECUs 200b to 200d is omitted.

ECU 200a includes frame transceiver 201, frame interpreter 202, external device controller 203, frame generator 204, and communication setting parameter holder 205. Note that ECU 200a is provided with a microcontroller including a processor and a memory, and that the aforementioned components included in ECU 200a are functional components implemented by the processor executing one or more programs stored in the memory. Each of ECUs 200b, ECU 200c, and ECU 200d is configured in the same manner as ECU 200a.

Frame transceiver 201 converts a physical signal received from bus 100a into a digital signal to obtain data of a frame (reception of a frame). Frame transceiver 201 is capable of properly receiving a frame transmitted from another ECU by synchronizing to this other ECU included in in-vehicle network system 10, by reference to communication setting parameters held in communication setting parameter holder 205. In response to a frame transmission request from frame generator 204, frame transceiver 201 converts a frame into a physical signal and transmits this physical signal to bus 100a at a predetermined timing i.e. a predetermined slot (transmission of a frame).

Frame interpreter 202 interprets a payload of the frame received from frame transceiver 201 and, on the basis of content of the payload, provides notification instructing external device controller 203 to control steering 210 connected to ECU 200a. In response to this notification, assist control of the steering is achieved in accordance with a moving status determined by frame interpreter 202 on the basis of information about a speed of the vehicle notified by another ECU, for example. As another example, automatic steering is performed in an automatic parking mode in response to a steering operation instruction signal received from an automatic parking ECU, which is not illustrated.

External device controller 203 controls steering 210 connected to ECU 200a. Moreover, external device controller 203 monitors a status of steering 210 and requests frame generator 204 for frame transmission to notify another ECU of the status. The status of steering 210 indicates a steering angle of steering 210, for example.

In response to the request from external device controller 203, frame generator 204 generates a frame and requests frame transceiver 201 to transmit this frame.

Communication setting parameter holder 205 holds parameters used for correctly converting a physical signal received from bus 100*a* into a digital signal. The parameters are shared in in-vehicle network system 10. Thus, the same parameters are stored in the other ECUs. The communication setting parameters are described in detail later, with reference to an example illustrated in FIG. 7.

[1.5 Configuration of Anomaly Detection ECU]

Figure 5:
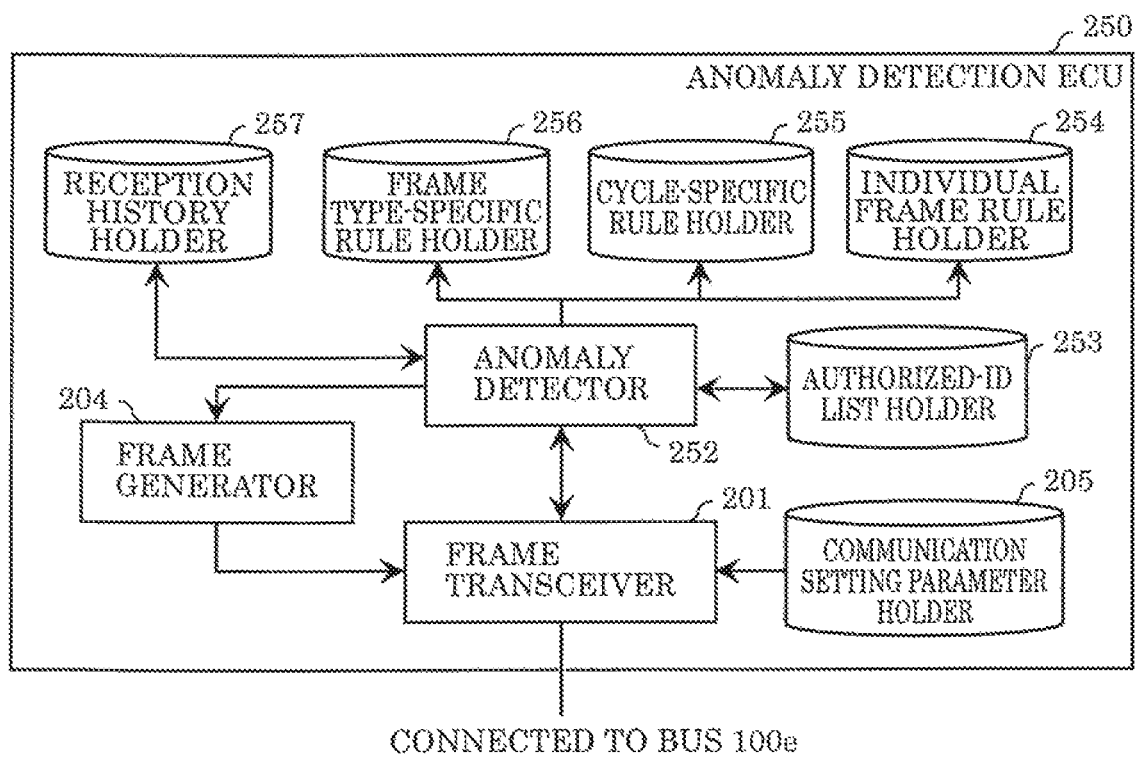
FIG. 5 is a block diagram illustrating an example of a functional configuration of an anomaly detection ECU according to Embodiment.

FIG. 5 is a block diagram illustrating an example of a functional configuration of anomaly detection ECU 250.

Anomaly detection ECU 250 includes frame transceiver 201, anomaly detector 252, frame generator 204, communication setting parameter holder 205, authorized-ID list holder 253, individual frame rule holder 254, cycle-specific rule holder 255, frame type-specific rule holder 256, and reception history holder 257. Here, a component that is the same as that included in ECU 200*a* is assigned the same reference mark used in ECU 200*a*, and description on this component is omitted. Note that anomaly detection ECU 250 is also provided with a microcontroller including a processor and a memory, and that the aforementioned components included in anomaly detection ECU 250 are functional components implemented by the processor executing one or more programs stored in the memory.

Anomaly detector 252 performs an anomaly detection process using at least one frame received by frame transceiver 201 from bus 100*e*. The anomaly detection process performed by anomaly detector 252 includes three kinds of processes, which are an individual frame anomaly detection process, a cycle-specific anomaly detection process, and a frame type-specific anomaly detection process.

By the individual frame anomaly detection process, anomaly detector 252 determines whether the received individual frame is anomalous. To make this determination, anomaly detector 252 first refers to an authorized-ID list stored in authorized-ID list holder 253 to verify whether a frame ID of the received frame is valid. If the frame ID of the received frame is valid, anomaly detector 252 further refers to a rule that is set for each frame ID and stored in individual frame rule holder 254 and to a reception history held in reception history holder 257. If content of the payload of the frame does not match this rule, anomaly detector 252 determines this frame to be anomalous. If determining that the received frame is anomalous, anomaly detector 252 requests frame generator 204 to transmit a frame to notify the other ECUs that an anomalous frame has been transmitted.

By the cycle-specific anomaly detection process, anomaly detector 252, which is notified of the start of a new cycle by frame transceiver 201, detects an occurrence of an anomalous frame by determining whether an anomalous frame has occurred in the immediately preceding cycle. To make this determination, anomaly detector 252 uses a cycle-specific rule stored in cycle-specific rule holder 255 and statistics information about the frames received in the immediately preceding cycle. This statistics information is based on a reception history stored in reception history holder 257. The cycle-specific anomaly detection process is described in detail later.

By the frame type-specific anomaly detection process, anomaly detector 252 detects an occurrence of an anomalous frame by determining whether an anomalous frame has occurred in the immediately preceding 64 cycles. To make this determination, anomaly detector 252 uses a frame type-specific rule stored in frame type-specific rule holder 256 and statistics information about the frames received in the immediately preceding cycles having the number of repeated cycles from 0 to 63. This statistics information is based on a reception history stored in reception history holder 257. The frame type-specific anomaly detection process is described in detail later.

If detecting the occurrence of the anomalous frame by the cycle-specific anomaly detection process or the frame type-specific anomaly detection process, anomaly detector 252 requests frame generator 204 to transmit a frame to notify the other ECUs of the occurrence of the anomalous frame. Moreover, after the frame type-specific anomaly detection process, anomaly detector 252 resets the statistics information, stored in reception history holder 257, about the frames received in the immediately preceding cycles having the number of repeated cycles from 0 to 63 (described later with reference to an example illustrated in FIG. 13C).

Authorized-ID list holder 253 stores a list of information about frames transmitted by the ECUs in the slots. FIG. 8 illustrates an example of an authorized-ID list held by authorized-ID list holder 253. The authorized-ID list is described in detail later.

Individual frame rule holder 254 stores a rule to be used by anomaly detector 252 for determining, when receiving a frame, whether this received frame is anomalous. FIG. 10 illustrates an example of an individual frame rule stored in individual frame rule holder 254. The individual frame rule is described in detail later.

Cycle-specific rule holder 255 stores a rule used by anomaly detector 252 for determining, for each cycle, whether an anomalous frame has occurred in the cycle. FIG. 11 illustrates an example of a cycle-specific rule stored in cycle-specific rule holder 255. The cycle-specific rule is described in detail later.

Frame type-specific rule holder 256 stores a rule used by anomaly detector 252 for determining whether an anomalous frame has occurred on the basis of statistics on the frames received in a series of cycles having the number of repeated cycles from 0 to 63. FIG. 12 illustrates an example of a frame type-specific rule stored in frame type-specific rule holder 256. The frame type-specific rule is described in detail later.

Reception history holder 257 stores information about a frame received by frame transceiver 201, such as a value indicated by the payload, meta information including a frame attribute, and the number of frame receptions. FIG. 13A, FIG. 13B, and FIG. 13C illustrate examples of a reception history stored in reception history holder 257. The reception history is described in detail later.

Note that frame transceiver 201 of anomaly detection ECU 250 is an example of a frame receiver according to the present embodiment.

[1.6 Configuration Diagram of Star Coupler]

Figure 6:
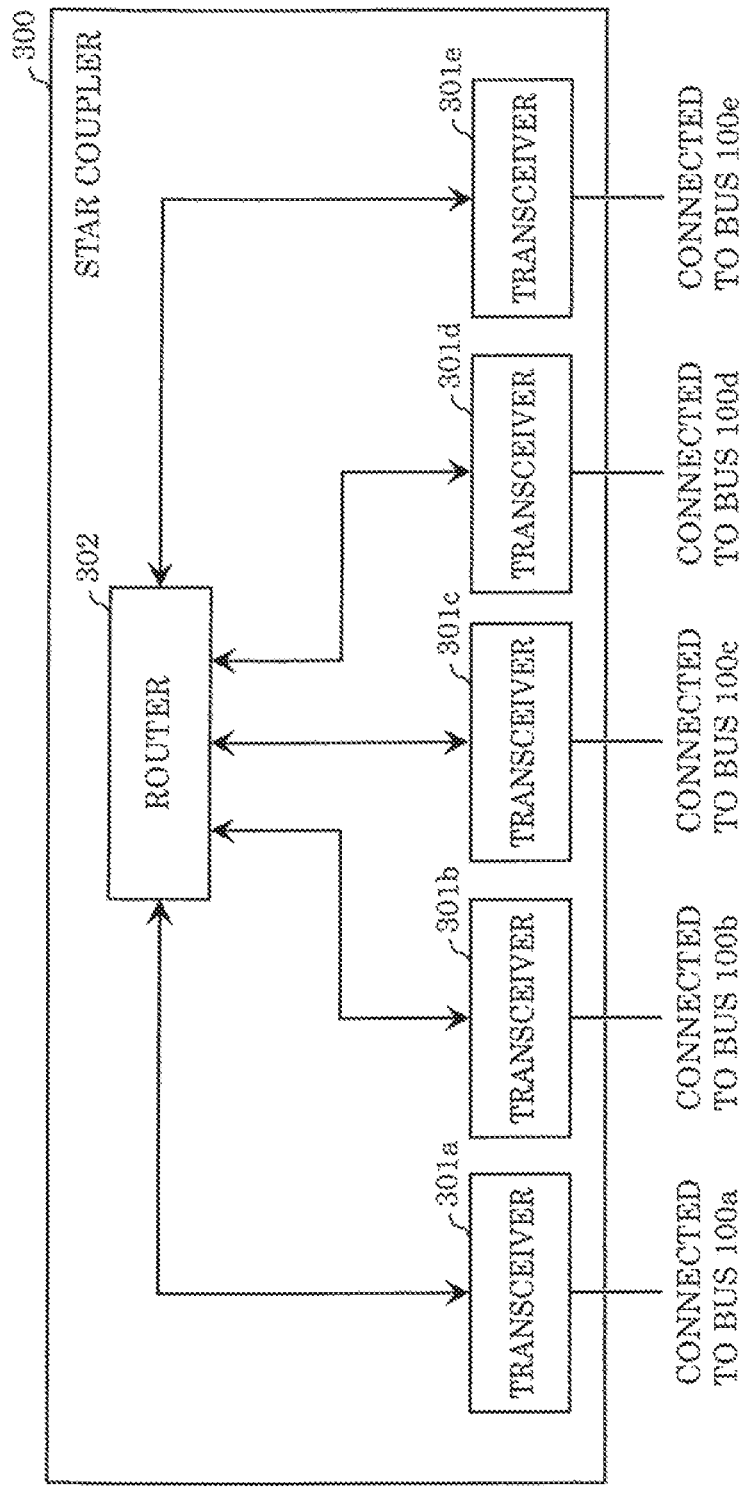
FIG. 6 is a block diagram illustrating an example of a configuration of a star coupler according to Embodiment.

FIG. 6 is a block diagram illustrating an example of a configuration of star coupler 300. Star coupler 300 includes transceivers 301*a*, 301*b*, 301*c*, 301*d*, and 301*e* and router 302.

Transceiver 301*a*, which is connected to bus 100*a*, converts a physical signal received from bus 100*a* into a digital signal and then notifies router 302 of this digital signal. Moreover, transceiver 301*a* converts a digital signal notified by router 302 into a physical signal and then transmits this physical signal to bus 100*a*. Similarly, transceiver 301*b*, transceiver 301*c*, and transceiver 301*d* are connected to bus 100b, bus 100c, and bus 100d, respectively. Each of transceivers 301b to 301e performs the same operation performed by transceiver 301a on a physical signal received from the bus connected.

Router 302 routes the digital signal notified by transceiver 301a to transceivers 301b, 301c, 301d, and 301e. Similarly, router 302 routes the digital signal notified by transceiver 301b to the transceivers except for transceiver 301b. When receiving the digital signals from more than one transceiver, router 302 routes the first digital signal received from one of the transceivers to the other transceivers.

[1.7 Communication Setting Parameters]

FIG. 7 illustrates an example of the communication setting parameters stored in communication setting parameter holder 205. The communication setting parameters are defined as follows: the data transfer speed is 10 Mbps; the slot ID of the static segment or more specifically, the frame ID of the frame transmitted and received in the slot is one of 1 to 50; the slot ID of the dynamic segment similarly, the frame ID is one of 51 to 100; and the payload length of the static frame is 8 that is, 16 bytes. These parameter values are shared by all the ECUs in the cluster. Transmission and reception of FlexRay frames are implemented on the basis of these parameter values. The values of the communication setting parameters illustrated in FIG. 7 are merely examples and thus different values may be used. The aforementioned communication setting parameters are also merely examples. Parameters that are not in FIG. 7 such as the segment length or the slot length may be included. In other words, not all the parameters in FIG. 7 are essential.

[1.8 Authorized-ID List]

FIG. 8 illustrates an example of an authorized-ID list stored in authorized-ID list holder 253 of anomaly detection ECU 250.

The example illustrated in FIG. 8 holds, for each slot, a slot ID, a cycle offset, a cycle reception, a frame name, and payload information included in the frame. The cycle offset and the cycle reception are information items required to extract a target frame when a method called "cycle multiplexing" is used. By this method, frames having the same slot ID but different data contents (types) are transmitted and received in different cycles. For example, four frames with the frame names D, E, F, and G have the same slot ID 99. These four frames include payloads containing different contents, which are camera information 1, camera information 2, camera information 3, and camera information 4. These frames are transmitted and received in different cycles.

For example, the cycle offset is 0 and the cycle reception is 4 for camera information 1. This indicates that transmission of frame D having the payload containing the data of camera information 1 starts in the cycle having the number of repeated cycles which is 0 and is executed every four cycles. More specifically, frame D is transmitted in the slot having the slot ID 99 in each of the cycles having the number of repeated cycles 0, 4, 8, 12, 16, . . . , 52, 56, and 60. Similarly, frame E containing camera information 2 is transmitted in the slot having the slot ID 99 in each of the cycles having the number of repeated cycles 1, 5, 9, . . . , 53, 57, and 61. Frame F containing camera information 3 is transmitted in the slot having the slot ID 99 in each of the cycles with the number of repeated cycles 2, 6, 10, . . . , 54, 58, and 62. Frame G containing camera information 4 is transmitted in the slot having the slot ID 99 in each of the cycles with the number of repeated cycles 3, 7, 11, . . . , 55, 59, and 63. In this way, cycle multiplexing enables the frames having the different contents to be transmitted in the slots having the same slot ID in the different cycles.

The content of the authorized-ID list illustrated as an example in FIG. 8 is described in more detail.

A first row of the authorized-ID list indicates that, in a slot having the slot ID 1, a frame having frame name A is transmitted according to a schedule in which the cycle offset is 0 and the cycle reception is 1 (or more specifically, the frame containing the fixed data is transmitted in all the cycles). The first row also indicates that content of the payload of frame A, that is, information indicated by the payload, is about a speed. A second row of the authorized-ID list indicates that no frame is transmitted in a slot having the slot ID 2. Moreover, the list indicates that, in a slot having the slot ID 3, a frame having frame name B is transmitted according to a schedule in which the cycle offset is 0 and the cycle reception is 2 or more specifically, the frame is transmitted only in the cycles with even number of repeated cycles. The list also indicates that information indicated by the payload of frame B is about a steering angle. Furthermore, the list indicates that, in a slot having the slot ID 98, a frame having frame name C is transmitted according to a schedule in which the cycle offset is 1 and the cycle reception is 2 or more specifically, the frame is transmitted only in the cycles with odd number of repeated cycles. The list also indicates that information indicated by the payload of frame C is about a gear status (indicating a position of a shift lever or a position of a selector). Moreover, the list indicates that, in a slot having the slot ID 99, a frame having frame name D is transmitted according to a schedule in which the cycle offset is 0 and the cycle reception is 4. The list also indicates that information indicated by the payload of frame D is predetermined information referred to as camera information 1. Furthermore, the list indicates that, in a slot having the slot ID 99, a frame having frame name E is transmitted according to a schedule in which the cycle offset is 1 and the cycle reception is 4. The list also indicates that information indicated by the payload of frame E is predetermined information referred to as camera information 2. Moreover, the list indicates that, in a slot having the slot ID 99, a frame having frame name F is transmitted according to a schedule in which the cycle offset is 2 and the cycle reception is 4. The list also indicates that information indicated by the payload of frame F is predetermined information referred to as camera information 3. Furthermore, the list indicates that, in a slot having the slot ID 99, a frame having frame name G is transmitted according to a schedule in which the cycle offset is 3 and the cycle reception is 4. The list also indicates that information indicated by the payload of frame G is predetermined information referred to as camera information 4. Moreover, the list indicates that, in a slot having the slot ID 100, a frame having frame name H is transmitted according to a schedule in which the cycle offset is 0 and the cycle reception is 4. The list also indicates that information indicated by the payload of frame H is a door status. By reference to the IDs included among the communication setting parameters in FIG. 7, frames A and B are static frames transmitted in static segments whereas frames C to H are dynamic frames transmitted in dynamic segments.

FIG. 9 illustrates a transmission-reception schedule of the frames having the number of repeated cycles from 0 to 63, in in-vehicle network system 10 based on the example of the authorized-ID list in FIG. 8. Each horizontal column indicates a slot ID, and each vertical row indicates the number of the cycle among the cycles to be repeated (repeated cycles). A cell determined by the slot ID and the number of repeated cycles stores a frame name of the frame to be transmitted in this slot (timing). In FIG. 9, frames C to H appear to be transmitted in predetermined cycles. However, these frames are dynamic frames and thus may not be transmitted even in timings indicated in the cells corresponding to the frame names.

As described above, the authorized-ID list indicates the predetermined schedules for transmitting and receiving the frames. Anomaly detector 252 uses this authorized-ID list as a whitelist to determine whether a frame received by anomaly detection ECU 250 follows the corresponding schedule. The determination made by anomaly detector 252 using this whitelist is described later.

[1.9 Individual Frame Rule]

FIG. 10 illustrates an example of individual frame rules stored in individual frame rule holder 254 of anomaly detection ECU 250. The individual frame rules are used together with the reception history, described later, in the individual frame anomaly detection process among the three kinds of anomaly detection processes performed by anomaly detector 252. In the example illustrated in FIG. 10, individual frame rule holder 254 stores the individual frame rules in a table having rows each of which indicates a rule for a frame specified by a frame name. For a dynamic frame, a reception rule is further set for each message ID. The message ID is effective for a dynamic frame having "1" as a preamble indicator included in the header segment. Two high-order bytes of the payload is used for the message ID.

As an individual frame rule for frame A in this example, frame A does not have a message ID because this frame is a static frame and has a payload length fixed to 8. Under a reception rule for frame A, if a difference between a speed indicated by the payload of frame A received this time and a speed indicated by frame A received last time is 0.5 km/h or greater, this frame is determined to be anomalous. Frame B does not have a message ID because this frame is a static frame, and has a payload length fixed to 8. Under a reception rule for frame B, if an angular difference between a steering angle indicated by the payload of frame B received this time and a steering angle indicated by the payload of frame B received last time is 30 degrees or greater, this frame is determined to be anomalous. Frame C does not have a message ID although this frame is a dynamic frame, and has a payload length of 16. Under a reception rule for frame C, this frame may be received if the vehicle is stopped or moving (i.e., the frame may be always received). Frame D does not have a message ID although this frame is a dynamic frame, and has a payload length of 32. Under a reception rule for frame D, this frame may be received if the vehicle is stopped. More specifically, the frame is determined to be anomalous if received while the vehicle is moving. Frame E does not have a message ID although this frame is a dynamic frame, and has a payload length of 32. Under a reception rule for frame E, this frame may be received if the vehicle is either stopped or moving. Frame F has three message IDs. An individual reception rule is set for each of the IDs 0x0001, 0x0002, and 0x0004. Frame F having the message ID 0x0001 has a payload length of 32. Under a reception rule for this frame, this frame is determined to be normal when received while the vehicle is stopped. Frame F having the message ID 0x0002 has a payload length of 32. Under a reception rule for this frame, this frame may be received while the vehicle is either stopped or moving. Frame F having the message ID 0x0004 has a payload length of 32. Under a reception rule for this frame, this frame is determined to be normal when received while the vehicle is moving. Frame G does not have a message ID although this frame is a dynamic frame, and has a payload length of 32. Under a reception rule for frame G, this frame may be received while the vehicle is either stopped or moving. Frame H does not have a message ID although this frame is a dynamic frame, and has a payload length of 2. Under a reception rule for frame H, this frame is determined to be normal when received while the vehicle is stopped.

Note that anomaly detection ECU 250 may determine whether the received frame is anomalous by making a determination whether the payload length of the received frame is correct by verifying this payload length against the payload length indicated by the individual frame rule.

[1.10 Cycle-Specific Rule]

FIG. 11 illustrates an example of cycle-specific rules stored in cycle-specific rule holder 255 of anomaly detection ECU 250. The cycle-specific rules are used in the cycle-specific anomaly detection process among the three kinds of anomaly detection processes performed by anomaly detector 252. In the example illustrated in FIG. 11, cycle-specific rule holder 255 stores the cycle-specific rules in a table having rows each of which indicates a rule for a cycle. In this table, each of the frames is specified by the number of repeated cycles (see the end of the header segment in FIG. 3).

The cycle-specific rule in the example illustrated in FIG. 11 relates to the number of receptions for each type according to meta information of the frame received in the cycle. Here, each of the types according to the meta information is an example of a first type according to the present embodiment. Each of the frames may belong to two or more of the first types or may not belong to any of the first types.

For example, reference ranges of statistics on frames transmitted and received in communications executed by in-vehicle network system 10 for the cycle having the number of repeated cycles which is 0 in a normal state are as follows: the number of dynamic frame is less than 20; the number of startup frames is less than 2; the number of sync frames is less than 2; the number of frames having "1" as the payload preamble indicator is less than 5; the number of null frames is less than 4; and the number of error frames is less than 5. A rule is similarly set for each of the cycles having the number of repeated cycles from 1 to 63. The values in the reference ranges of the frame statistics described above may be determined on the basis of, for example, the communication setting parameters (see FIG. 7), the authorized-ID list (see FIG. 8) or the transmission schedule based on this authorized-ID list (see FIG. 9), and actual numbers obtained from test installation of the communication network using the aforementioned communication setting parameters and the transmission schedule. Each of the upper limits of the statistics in the reference ranges is determined on the basis of whether the frames transmitted in the cycle have at least a certain chance of including an anomalous frame.

While the frames are received in the cycle having the number of repeated cycles which is 0, for example, anomaly detector 252 of anomaly detection ECU 250 obtains the statistics on the numbers of receptions of frames having the respective attributes, on the basis of the values included in the header segments or the trailer segments of these frames. Moreover, by reference to information, held in a receive buffer of anomaly detection ECU 250, indicating the presence or absence of an error for each frame, anomaly detector 252 obtains a statistic on frames having errors. The statistic on the number of frame receptions for each of the first types is an example of a first statistic according to the present embodiment. After the completion of this cycle, anomaly detector 252 verifies the first statistics against the aforementioned reference ranges. If any of the statistics does not satisfy the reference range, this means anomaly detector 252 detects an occurrence of an anomalous frame in this cycle. Then, after each end of the communications in the cycles having the number of repeated cycles from 1 to 63, determination is similarly made by verifying the first statistics against the reference ranges included in the corresponding cycle-specific rule. The cycle-specific rule used in this way is an example of a first rule according to the present embodiment.

The above-described anomaly detection method based on the cycle-based statistics for each type according to the meta information of the frame can also detect an occurrence of an anomalous frame in a communication network adopting the time-triggered protocol. Here, this method is incapable of accurately identifying an anomalous frame or a cause (such as a transmission node) of the anomalous frame. However, a processing load of this method is smaller than an anomaly detection method that is based on whether the payload of the frame has an anomaly. Thus, in a normal time, this method may refer to the cycle-specific rule to determine whether an anomalous frame has occurred so that resources required for anomaly detection in the communication network may be reduced. Then, if the occurrence of the anomalous frame is detected by this method, the value of the payload of the frame may be verified in detail to identify the node that is the transmission source of the anomalous frame or the branch that includes the node. In the case of the in-vehicle network as in the example according to the present embodiment, the use of advanced functions related to information processing of the vehicle may be restricted upon the detection of the occurrence of the anomalous frame by this method. This can avoid serious danger caused by, for example, intervention in a drive operating system by the anomalous frame.

The above description with reference to FIG. 11 presents an example in which an individual rule is defined for each cycle. However, one cycle-specific rule may be defined for a plurality of cycles. This can reduce the memory required to hold the cycle-specific rules. For example, the cycle-specific rule may be shared by a plurality of cycles regardless of the number of repeated cycles. Alternatively, one rule may be defined for each combination of the cycle offset and the cycle reception, for example. Or, one rule may be defined for two or more consecutive cycles. For example, a first rule may indicate reference ranges of statistics on frames received in the cycles having the number of repeated cycles from 0 to 1 and, from then on, one rule may be defined for each set of two cycles. In this case, a determination whether an anomalous frame has occurred is made once using the cycle-specific rule whenever the execution of two cycles has completed. This can also reduce the processing load of the anomaly detection process.

Note that not all the reference ranges for the first types illustrated as an example in FIG. 11 are essential for the cycle-specific rule. The cycle-specific rule may include the reference ranges of only some of the first types. Moreover, items for which the reference ranges are defined may be different among a plurality of cycle-specific rules.

[1.11 Frame Type-Specific Rule]

FIG. 12 illustrates an example of frame type-specific rules stored in frame type-specific rule holder 256 of anomaly detection ECU 250. The frame type-specific rules are used in the frame type-specific anomaly detection process among the three kinds of anomaly detection processes performed by anomaly detector 252. In the example illustrated in FIG. 12, frame type-specific rule holder 256 stores the frame type-specific rules in a table having rows each of which indicates a rule for a frame specified by a frame name.

The frame type-specific rules in the example illustrated in FIG. 12 provides rules for the frames received while communications of 64 cycles having the number of repeated cycles from 0 to 63 are executed in in-vehicle network system 10. The rules relate to: the number of receptions for each type according to the content of the payload described with reference to FIG. 8 (the "Number of receptions" column); and the numbers of receptions for each type according to the content of the payload described with reference to FIG. 8, for each of the first types (from the "Startup frame" column to the "Error" column). Note that the type according to the content of the payload is an example of a second type according to the present embodiment.

For example, reference ranges of statistics on frame A transmitted and received in 64 cycles having the number of repeated cycles from 0 to 63 in in-vehicle network system 10 in a normal state are as follows: the number of receptions is 64; the number of startup frames is less than 3; the number of sync frames is 64; the number of frames having "1" as the payload preamble indicator is 0; the number of null frames is less than 3; and the number of error frames is less than 3. A rule is similarly set for each of frames B to H. As in the case of the cycle-specific rules, the values in the reference ranges of the frame statistics described above may be determined on the basis of, for example, the communication setting parameters (see FIG. 7), the authorized-ID list (see FIG. 8) or the transmission schedule based on this authorized-ID list (see FIG. 9), and actual numbers obtained from test installation of the communication network using the aforementioned communication setting parameters and the transmission schedule. Each of the upper limits of the statistics in the reference ranges is determined on the basis of whether the frames transmitted in the cycle have at least a certain chance of including an anomalous frame.

While the frames are received in the communications for the 64 cycles having the number of repeated cycles from 0 to 63, anomaly detector 252 of anomaly detection ECU 250 obtains the statistics on the number of frame receptions for each second type and the statistics on the number of frame receptions for each first type for each second type, on the basis of the values included in the header segment or the trailer segment of the frame or the information in the receive buffer indicating the presence or absence of an error in the frame. The statistic for each of the second types is an example of a second statistic according to the present embodiment. After the completion of the cycles having the number of repeated cycles from 0 to 63, anomaly detector 252 verifies the second statistics against the aforementioned reference ranges. If any of the statistics does not satisfy the reference range, this means anomaly detector 252 detects an occurrence of an anomalous frame. From then on, after the completion of 64 cycles having the number of repeated cycles from 0 to 63, determination is similarly made by verifying the second statistics against the reference ranges included in the corresponding frame type-specific rules. The frame type-specific rule used in this way is an example of a second rule according to the present embodiment.

The above-described anomaly detection method based on the statistics on the multiple cycles for each type according to the content of the payload of the frame can also detect an occurrence of an anomalous frame in a communication network adopting the time-triggered protocol. Here, this method is incapable of accurately identifying an anomalous frame or a cause (such as a transmission node) of the anomalous frame. However, a processing load of this method is smaller than an anomaly detection method that is based on whether the payload of the frame has an anomaly. Thus, in a normal time, this method may refer to the cycle-specific rule to determine whether an anomalous frame has occurred so that resources required for anomaly detection in the communication network may be reduced. Then, if the occurrence of the anomalous frame is detected by this method, the value of the payload of the frame may be verified in detail to identify the node that is the transmission source of the anomalous frame or the branch that includes the node. In the case of the in-vehicle network as in the example according to the present embodiment, the use of advanced functions related to information processing of the vehicle may be restricted upon the detection of the occurrence of the anomalous frame by this method. This can avoid serious danger caused by, for example, intervention in a drive operating system by the anomalous frame.

The above description with reference to FIG. 12 presents an example in which an individual rule is defined for each frame type. However, one frame type-specific rule may be defined for a plurality of frame types. For example, one rule may be shared by a plurality of frame types relating to predetermined linked functions. Specific examples of the frame types relating to the predetermined linked functions may include frames D, E, F, and G each containing camera information in the payload. Such a way of defining rules can reduce the memory required to hold the frame type-specific rules.

Note that not all the numbers of frame receptions nor not all the reference ranges for the first types illustrated as an example in FIG. 12 are essential for the frame type-specific rules. The frame type-specific rule may include only some of these. Moreover, items for which the reference ranges are defined may be different among a plurality of frame type-specific rules.

By way of comparison, the method using the cycle-specific rules described above is incapable of identifying the type of the frame detected as an anomalous frame. In contrast, the method using the frame type-specific rules is capable of identifying the type of the frame detected as an anomalous frame. Depending on circumstances, the method is capable of identifying a transmission node of this anomalous frame or the branch including this transmission node, or identifying a node or branch that is affected by this anomalous frame. Thus, in the case of the in-vehicle network as in the example according to the present embodiment, the target advanced functions to be restricted to avoid serious danger may be narrowed down to the functions related to the transmission node or branch, or related to the node or branch that is affected by the anomalous frame. In this case, however, the frequency at which whether an anomaly is detected is determined is lower than the case of using the method performed with the cycle-specific rules. As compared with the example described with reference to FIG. 11, the frequency at which whether an anomaly is detected is determined in the example described with reference to FIG. 12 is ¹⁄₆₄. Thus, both of these methods may be used to achieve both early detection of occurrence of an anomalous frame and identification of the frame type. For the combined adoption of these methods, both the cycle-specific rules and the frame type-specific rules may be used all the time, or the rules may be switched in accordance with the processing load in the communication network or the possibility of occurrence of an anomaly. For example, the anomaly detection process may be executed using one of these two sets of rules to reduce the processing load in a normal time. Then, when the occurrence of the anomalous frame is detected, the anomaly detection process may be executed using the other set of rules for verification. Moreover, a different handling process may be performed for each of the cases where the occurrence of the anomalous frame is detected by only one of the anomaly detection processes and where the occurrence of the anomalous frame is detected by both of the anomaly detection processes.

Here, the process may also be performed in relation to the individual frame anomaly detection process. If an occurrence of an anomalous frame has been detected using one of or both the cycle-specific rules and the frame type-specific rules, anomaly detector 252 may execute the individual frame anomaly detection process to determine whether the received individual frame is anomalous. In this way, the process to be performed is switched in the communication network adopting the time-triggered protocol, among the effective anomaly detection processes having the different processing loads and the different anomaly detection levels (or more specifically, the anomaly detection is performed to determine: the presence or absence of an anomaly; an anomaly according to the frame type; and an anomaly according to an individual frame). This can reduce the processing load and, in addition, secure the safety by ensuring or enhancing the accuracy of anomaly detection.

[1.12 Reception History]

Each of FIG. 13A, FIG. 13B, and FIG. 13C illustrates an example of a reception history stored in reception history holder 257 of anomaly detection ECU 250. FIG. 13A illustrates, as an example of information included in the reception history, the information about: a value indicated by the received frame for each type according to content of the payload (that is, for each second type) (hereinafter, this value is referred to as the reception value); and a vehicle status determined on the basis of the reception value of a frame of predetermined type. FIG. 13B illustrates, as an example of information included in the reception history, the information about statistics on the number of receptions for each frame type according to the meta information (that is, for each first type) for each cycle. FIG. 13C illustrates, as an example of information included in the reception history, the information about statistics on the number of receptions for each frame type according to the meta information (that is, for each first type), for each type according to the content of the payload of the frame (that is, for each second type) in the cycles having the number of repeated cycles from 0 to 63. These examples are described in detail as follows.

The reception history illustrated in FIG. 13A indicates the information about the reception value and the reception time for each second type of frame.

The example in FIG. 13A illustrates that the reception value of frame A indicating the speed of the vehicle is 40.5 km/h, and that the reception time of frame A is 12100 μs. The reception value of frame B indicating the steering angle is 5 degrees, and the reception time of frame B is 8140 μs. The reception value of frame C indicating the gear status is "D" (a driving state), and the reception time of frame C is 12400 μs. The reception value of frame D indicating camera information 1 indicates detection of a vehicle ahead, and the reception time of frame D is 1440 μs. The reception value of frame E indicating camera information 2 indicates detection of a pedestrian, and the reception time of frame E is 5480 μs. The reception value of frame F indicating camera information 3 indicates detection of a lane, and the reception time of frame F is 9520 μs. The reception value of frame G indicating camera information 4 indicates detection of an inactive state of a vehicle rear camera, and the reception time of frame G is 13560 μs. The reception value of frame H indicating the door status indicates an "all closed" state, and the reception time of frame H is 1600 µs. This example also illustrates that the vehicle status is "moving" as a result of determination made using frame A. When the speed of the vehicle indicated by frame A is more than 0 km/h, the information about the vehicle status is updated to "moving". When the speed is 0 km/h, this information is updated to "stopped". Note that each of the aforementioned reception values is updated by anomaly detector 252 whenever the corresponding one of frames A to H is received, for example.

Although stored in this example, the reception times are not essential. The reception time is expressed in is to indicate a period of time elapsed from a predetermined reference time. However, any time unit may be used. For example, the number of microticks calculated from an internal clock used in the FlexRay protocol and the number of macroticks defined using microticks may be used.

The reception history illustrated in FIG. 13B indicates, for each first type for each cycle specified by the number of repeated cycles, the information about: the number of frame receptions, or more specifically, the number of dynamic-frame receptions in this example; the number of startup-frame receptions; the number of sync-frame receptions; the number of receptions of frames each having "1" as the payload preamble indicator; the number of null-frame receptions; and the number of receptions of frames each having an error flag.

In the cycle having the number of repeated cycles which is 0 in the example illustrated in FIG. 13B, the number of dynamic-frame receptions is 10, the number of startup-frame receptions is 0, the number of sync-frame receptions is 1, the number of receptions of frames each having "1" as the payload preamble indicator is 0, the number of null-frame receptions is 0, and the number of error frames is 1. Similarly, in the cycle having the number of repeated cycles which is 1, the number of dynamic-frame receptions is 11, the number of startup-frame receptions is 0, the number of sync-frame receptions is 1, the number of receptions of frames each having "1" as the payload preamble indicator is 0, the number of null-frame receptions is 0, and the number of error frames is 1. Similarly, in the cycle having the number of repeated cycles which is 2, the number of dynamic-frame receptions is 10, the number of startup-frame receptions is 0, the number of sync-frame receptions is 1, the number of receptions of frames each having "1" as the payload preamble indicator is 1, the number of null-frame receptions is 0, and the number of error frames is 1. Similarly, in the cycle having the number of repeated cycles which is 3, the number of dynamic-frame receptions is 12, the number of startup-frame receptions is 0, the number of sync-frame receptions is 0, the number of receptions of frames each having "1" as the payload preamble indicator is 1, the number of null-frame receptions is 0, and the number of error frames is 1. Similarly, in the cycle having the number of repeated cycles which is 61, the number of dynamic-frame receptions is 10, the number of startup-frame receptions is 0, the number of sync-frame receptions is 1, the number of receptions of frames each having "1" as the payload preamble indicator is 1, the number of null-frame receptions is 0, and the number of error frames is 1. Similarly, in the cycle having the number of repeated cycles which is 62, the number of dynamic-frame receptions is 12, the number of startup-frame receptions is 0, the number of sync-frame receptions is 1, the number of receptions of frames each having "1" as the payload preamble indicator is 1, the number of null-frame receptions is 0, and the number of error frames is 1. Similarly, in the cycle having the number of repeated cycles which is 63, the number of dynamic-frame receptions is 10, the number of startup-frame receptions is 0, the number of sync-frame receptions is 1, the number of receptions of frames each having "1" as the payload preamble indicator is 1, the number of null-frame receptions is 0, and the number of error frames is 1. These values are updated by anomaly detector 252 whenever the corresponding frame is received, for example.

Although only the number of dynamic-frame receptions is stored in the example illustrated in FIG. 13B, the number of static-frame receptions may be stored. Moreover, although the number of frames having errors is stored in the example illustrated in FIG. 13B, the number of frames having errors may be stored for each of specific error flags (such as flags for a syntax error, a content error, and a boundary error).

The reception history illustrated in FIG. 13C indicates the information about the number of frame receptions for each type according to the content of the payload of the frame in the cycles having the number of repeated cycles from 0 to 63. This reception history also indicates the information about the number of frame receptions for each type according to the meta information, or more specifically in this example: the number of startup-frame receptions; the number of sync-frame receptions; the number of receptions of frames each having "1" as the payload preamble indicator; the number of null-frame receptions; and the number of receptions of frames each having an error flag. As for frame A stored in the example illustrated in FIG. 13C, the number of receptions is 64, the number of startup-frame receptions is 0, the number of sync-frame receptions is 64, the number of receptions of frames each having "1" as the payload preamble indicator is 0, the number of null-frame receptions is 0, and the number of error frames is 0. Similarly, as for frame B, the number of receptions is 32, the number of startup-frame receptions is 0, the number of sync-frame receptions is 0, the number of receptions of frames each having "1" as the payload preamble indicator is 0, the number of null-frame receptions is 0, and the number of error frames is 15. Similarly, as for frame C, the number of receptions is 32, the number of startup-frame receptions is 0, the number of sync-frame receptions is 0, the number of receptions of frames each having "1" as the payload preamble indicator is 0, the number of null-frame receptions is 0, and the number of error frames is 0. Similarly, as for frame D, the number of receptions is 16, the number of startup-frame receptions is 0, the number of sync-frame receptions is 0, the number of receptions of frames each having "1" as the payload preamble indicator is 0, the number of null-frame receptions is 0, and the number of error frames is 0. Similarly, as for frame E, the number of receptions is 16, the number of startup-frame receptions is 0, the number of sync-frame receptions is 0, the number of receptions of frames each having "1" as the payload preamble indicator is 0, the number of null-frame receptions is 0, and the number of error frames is 0. Similarly, as for frame F, the number of receptions is 16, the number of startup-frame receptions is 0, the number of sync-frame receptions is 0, the number of receptions of frames each having "1" as the payload preamble indicator is 16, the number of null-frame receptions is 0, and the number of error frames is 0. Similarly, as for frame G, the number of receptions is 16, the number of startup-frame receptions is 0, the number of sync-frame receptions is 0, the number of receptions of frames each having "1" as the payload preamble indicator is 0, the number of null-frame receptions is 0, and the number of error frames is 0. Similarly, as for frame H, the number of receptions is 8, the number of startup-frame receptions is 0, the number of sync-frame receptions is 0, the number of receptions of frames each having "1" as the payload preamble indicator is 0, the number of null-frame receptions is 0, and the number of error frames is 0. These values are updated by anomaly detector 252 whenever the corresponding frame is received, for example.

The example illustrated FIG. 13C stores the statistics for each frame type specified by the frame name (a combination of the slot ID, the cycle offset, and the cycle reception). However, the statistics used for anomaly determination is not limited to this. For example, statistics for each of message IDs of the dynamic frames may be stored. FIG. 13D illustrates an example of such reception history that stores the statistics for each of message IDs of the dynamic frames.

[1.13 Operation Performed by Anomaly Detection ECU]

Next, an operational procedure performed by anomaly detection ECU 250 that includes the aforementioned components and performs anomaly detection using the rules and the reception history is described with reference to an example. Note that the operation performed by anomaly detection ECU 250 is achieved by the components of anomaly detection ECU 250 that execute processes. Thus, the following description on the processes performed by the components of anomaly detection ECU 250 can also be understood as description on the operation performed by anomaly detection ECU 250.

Figure 14:
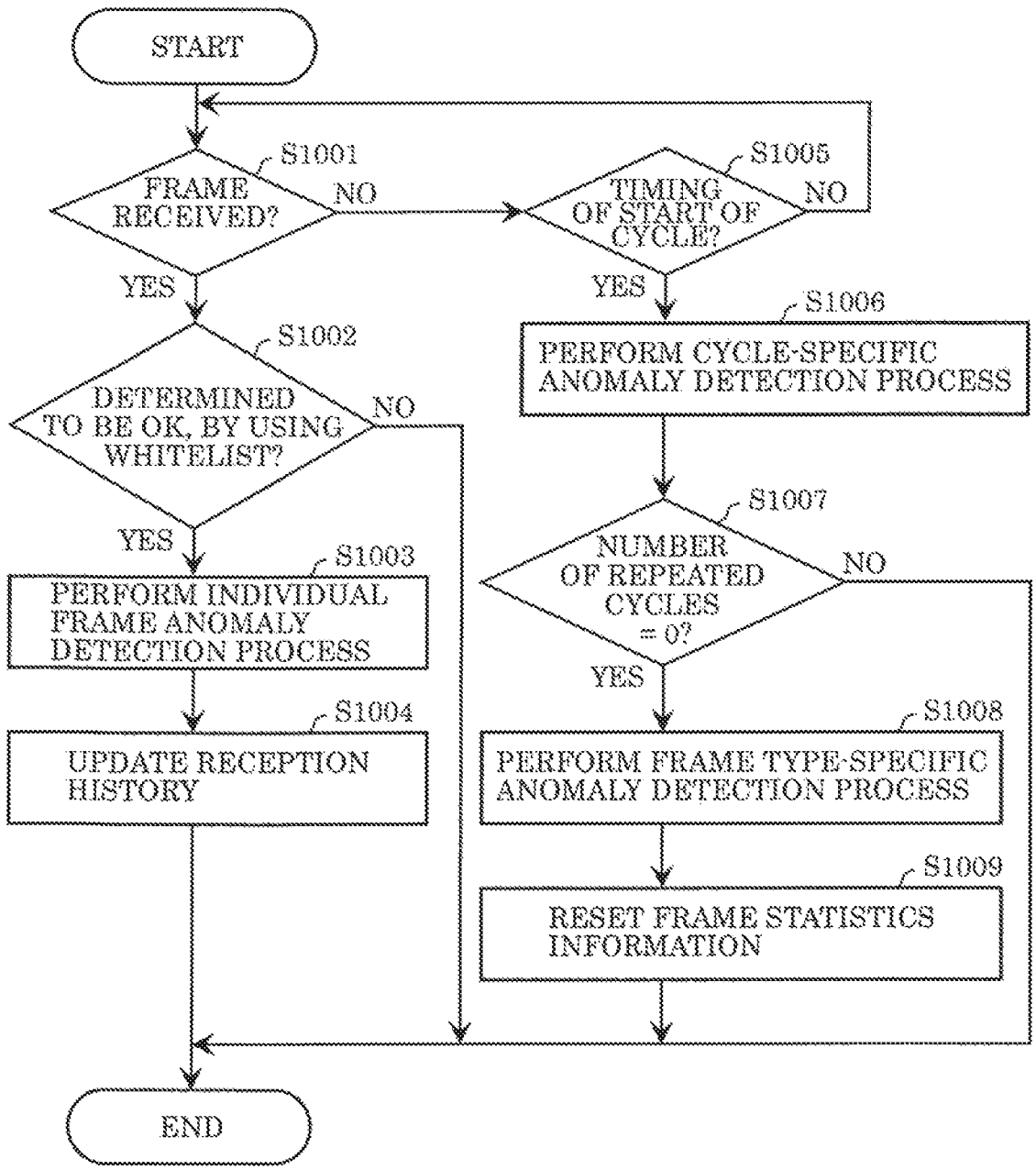
FIG. 14 is a flowchart of an example of an operational procedure performed by the anomaly detection ECU according to Embodiment.

FIG. 14 is a flowchart of an example of the operational procedure performed by anomaly detection ECU 250.

Frame transceiver 201 of anomaly detection ECU 250 determines whether a frame has been received (S1001).

If the frame has been received (Yes in S1001), anomaly detector 252 performs checking using the authorized-ID list as a whitelist (S1002). If no frame has been received (No in S1001), anomaly detector 252 determines whether it is a timing of the start of a cycle (S1005).

If the frame is determined to be OK by the checking (S1002) using the whitelist (Yes in S1002), anomaly detector 252 executes the individual frame anomaly detection process on the received frame (S1003). After this, anomaly detector 252 updates the reception history stored in reception history holder 257 (S1004) and the process performed on the frame by anomaly detection ECU 250 ends. If the frame is determined to be NG by the checking using the whitelist (No in S1002), the process performed on the frame by anomaly detection ECU 250 also ends. The checking using the whitelist (S1002) and the individual frame anomaly detection process (S1003) are described later using examples of procedures.

In contrast, if determining (S1005) that it is the timing of the start of the cycle (Yes in S1005), anomaly detector 252 executes the cycle-specific anomaly detection process on a frame received while at least one immediately preceding cycle is in progress (S1006). If determining that it is not the timing of the start of the cycle (No in S1005), anomaly detection ECU 250 returns to Step S1001.

After the end of the cycle-specific anomaly detection process (S1006), anomaly detector 252 determines whether the current cycle has the number of repeated cycles which is 0 (S1007). If the number of repeated cycles is 0 (Yes in S1007), anomaly detector 252 executes the frame type-specific anomaly detection process on frames received during at least two immediately preceding cycles, or more specifically, 64 immediately preceding cycles having the number of repeated cycles from 0 to 63 (S1008). After this, anomaly detector 252 resets the statistics information of the cycles (see FIG. 13C), stored in reception history holder 257, on which the frame type-specific anomaly detection process has been performed (S1009). If the number of repeated cycles is not 0 (No in S1007), the process performed by anomaly detection ECU 250 ends.

Note that the operation procedure performed by anomaly detection ECU 250 as illustrated in the flowchart of FIG. 14 is an example and that various modifications may be made. For example, in the example of the procedure illustrated in FIG. 14, each of the three anomaly detection processes is executed when target data is received in units of frames or cycles. In addition to this, the process to be executed may be selectively switched among the three anomaly detection processes in accordance with the processing load of the selected anomaly detection process or the possibility of occurrence of an anomaly (i.e., an anomalous frame).

[1.14 Checking Using Whitelist]

Figure 15:
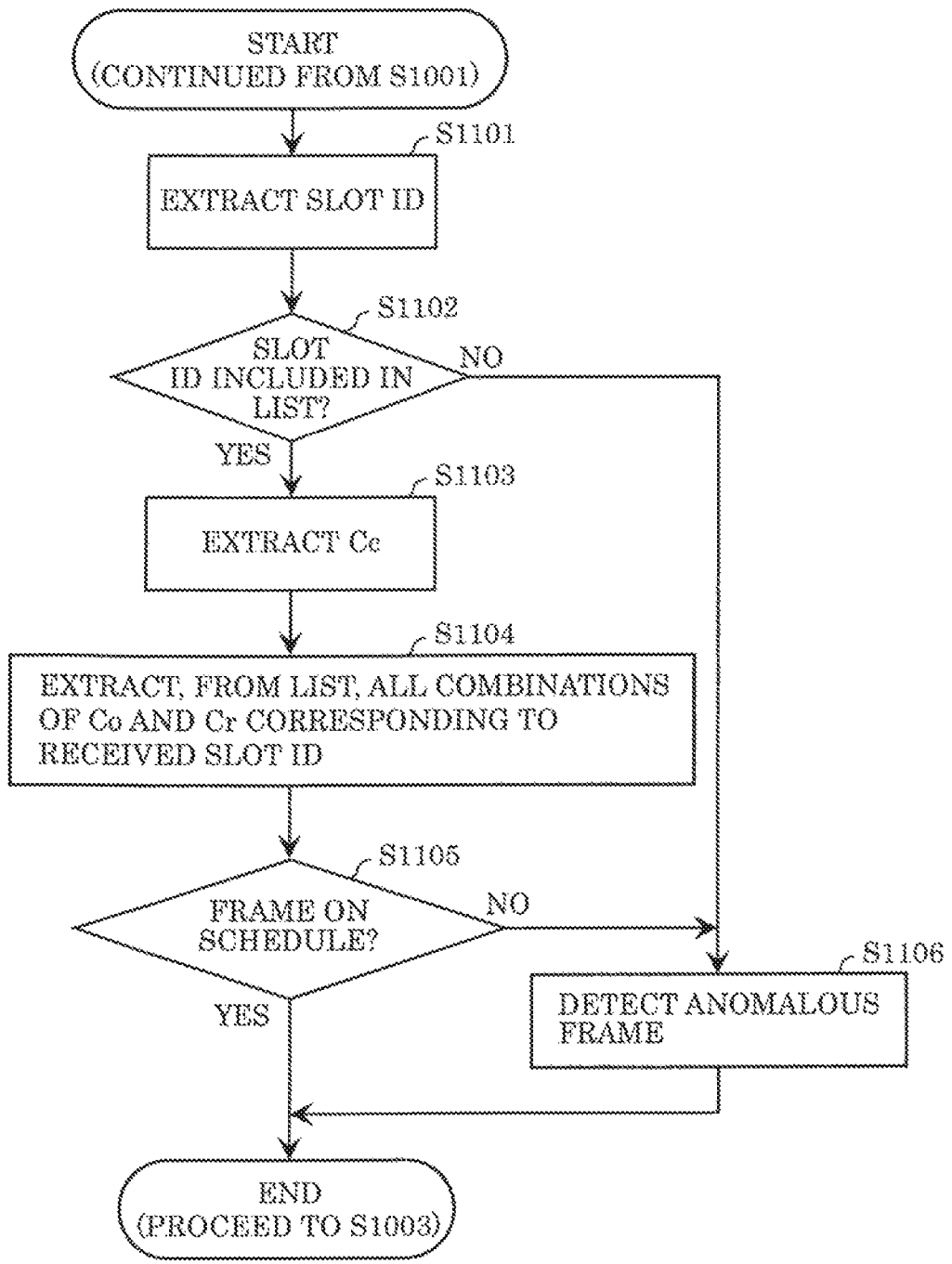
FIG. 15 is a flowchart of an example of a checking procedure performed by the anomaly detection ECU using a whitelist, according to Embodiment.

FIG. 15 is a flowchart illustrating details of the checking (S1002) performed using the authorized-ID list as the whitelist. The checking is included in the operational procedure performed by anomaly detection ECU 250 described with reference to FIG. 14.

If determining in S1001 in FIG. 14 that the frame has been received, anomaly detection ECU 250 extracts the slot ID included in the frame (S1101). If the extracted slot ID is not included in the authorized-ID list stored in authorized-ID list holder 253 (No in S1102), anomaly detector 252 determines that the frame is anomalous (S1106) and the process of anomaly detection ECU 250 ends. If the extracted slot ID is included in the authorized-ID list, anomaly detector 252 extracts the number of repeated cycles (also referred to as "Cc" in the following and in the drawing) included in the frame (S1103). Next, anomaly detector 252 extracts, from the authorized-ID list, all combinations of the cycle offset (also referred to as "Co" in the following and in the drawing) and the cycle reception (also referred to as "Cr" in the following and in the drawing) corresponding to the slot ID of the received frame (S1104).

Next, anomaly detector 252 verifies whether the received frame has been transmitted according to the transmission-reception schedule based on the authorized-ID list (S1105). For example, anomaly detector 252 determines, for each of the combinations of Co and Cr extracted in S1104, whether a remainder is 0 if a value obtained by subtracting the value of Co from the value of the extracted Cc is divided by Cr. This method is based on the fact that the remainder is 0 if the frame has been transmitted according to the transmission-reception schedule. If no combination has the result as "0" (No in S1105), the received frame is determined to be anomalous (S1106) and the process of anomaly detection ECU 250 ends. If any combination has the result as "0" (Yes in S1105), anomaly detector 252 proceeds to a next step (S1003).

[1.15 Individual Frame Anomaly Detection Process]

Figure 16:
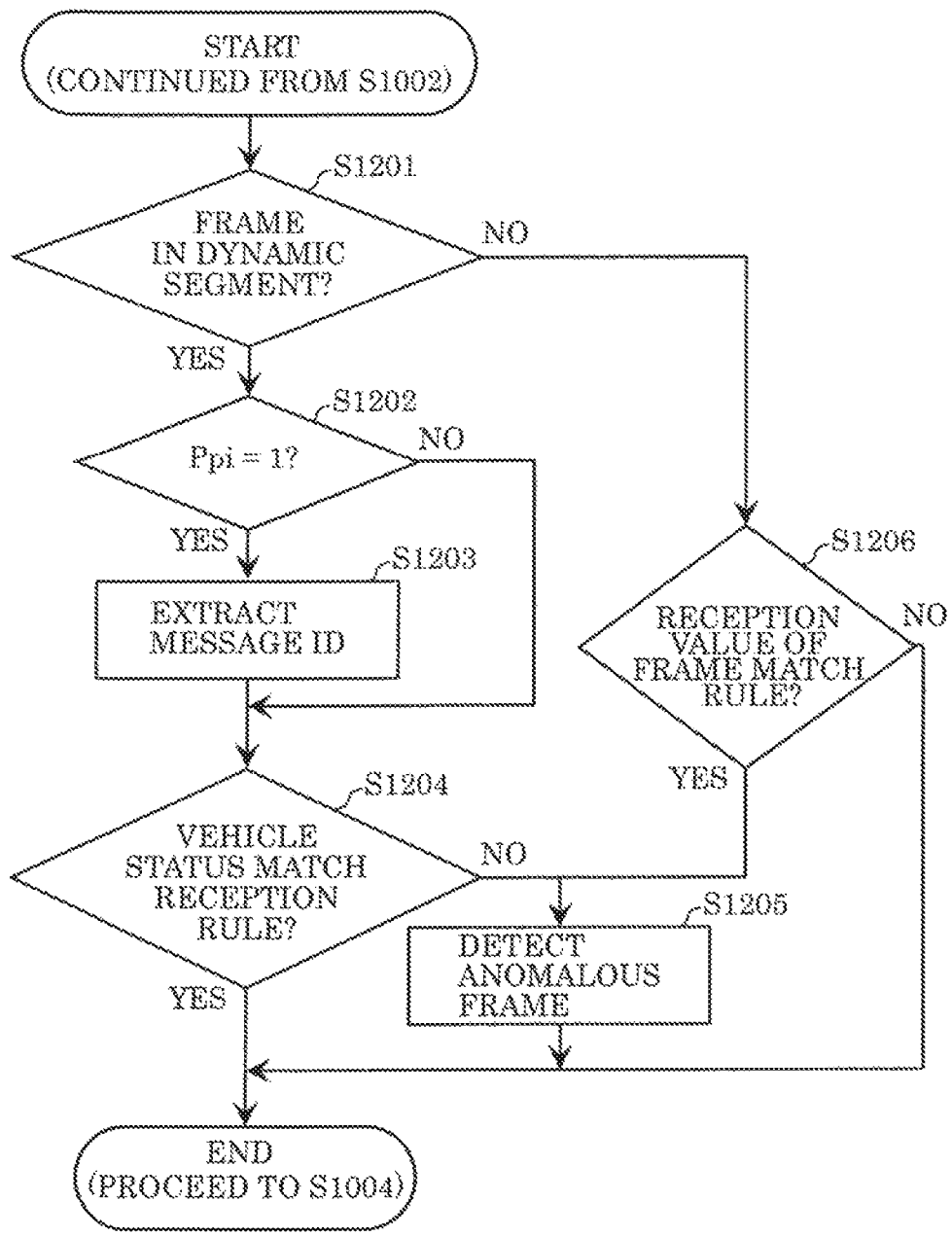
FIG. 16 is a flowchart of an example of a frame anomaly detection process performed by the anomaly detection ECU, according to Embodiment.

FIG. 16 is a flowchart illustrating details of the individual frame anomaly detection process (S1003) included in the operational procedure performed by anomaly detection ECU 250 described with reference to FIG. 14.

Anomaly detector 252 determines whether the frame, which is determined not to be anomalous in Step S1002 because the frame has been transmitted on schedule, is a dynamic frame (S1201). If the frame is the dynamic frame (Yes in S1201), anomaly detector 252 verifies whether the payload preamble indicator (denoted as "Ppi" in the drawing) included in the frame is 1 (S1202). If the received frame is not a dynamic frame, that is, if the received frame is a static frame (No in S1201), anomaly detector 252 determines, based on the corresponding reception history stored in reception history holder 257 and the payload value of the frame, whether the frame matches the corresponding individual frame rule stored in individual frame rule holder 254 (the rule for frame A or B in FIG. 10, for example) (S1206).

If the payload preamble indicator is 1 in Step S1202 (Yes in S1202), this means that the message ID is included in the payload part of the frame. Anomaly detector 252 extracts this message ID (S1203). After the message ID is extracted or if the payload preamble indicator is 0 (No in S1202), anomaly detector 252 determines whether the vehicle status indicated in the reception history stored in reception history holder 257 matches the reception rule defined in the corresponding individual frame rule stored in individual frame rule holder 254 (S1204). For example, suppose that the vehicle status indicated in the reception history is "moving" and that the received frame is frame D. In this case, this vehicle status does not match the reception rule included in the individual frame rule in FIG. 10. If the vehicle status matches the reception rule (matches the individual frame rule) (Yes in S1204), anomaly detector 252 proceeds to a next step (S1004). If the vehicle status does not match the reception rule (No in S1204), anomaly detector 252 determines that the frame is anomalous (S1205). Then, anomaly detector 252 ends the individual frame anomaly detection process and proceeds to the next step (S1004). By the anomaly detection process using the individual frame rule (S1003), the dynamic frame, which is not determined to be anomalous by satisfying a predetermined relationship between its slot ID and the number of repeated cycles in the checking performed earlier using the whitelist, may be determined to be anomalous on the basis of the vehicle status detected when this frame is received.

If the frame does not match the corresponding individual frame rule in Step S1206 (NO in S1206), anomaly detector 252 determines that the frame is anomalous (S1205). Then, anomaly detector 252 ends the individual frame anomaly detection process and proceeds to the next step (S1004). If the frame matches the individual frame rule, anomaly detector 252 proceeds to the next step (S1004).

OTHER EMBODIMENTS AND SUPPLEMENTARY DESCRIPTION

Although the anomaly detection device and the anomaly detection method according to one or more aspects of the present disclosure have been described based on the embodiments, the present disclosure is not limited to the embodiments. Those skilled in the art will readily appreciate that embodiments arrived at by making various modifications to the above embodiment or embodiments arrived at by selectively combining elements disclosed in the above embodiment without materially departing from the scope of the present disclosure may be included within the present disclosure. The following describes such modifications of the embodiments and the supplementary description for the embodiments.

(1) In the above embodiments, the star network topology illustrated in FIG. 1 is described as an example. However, the applicable network topology is not limited to this example. The secure star coupler and so forth according to the present disclosure are applicable to a bus network topology and a star-bus hybrid network topology, for example.

(2) Although the anomaly detector is included in the anomaly detection ECU in the above embodiment, some or all of the other ECUs in the in-vehicle network may include the anomaly detector. In this case, each of the ECUs including the anomaly detector functions as an anomaly detection device to detect an occurrence of an anomalous frame. This can effectively keep the device controlled by the ECU from being controlled using an anomalous frame. Moreover, the anomaly detector may be included in a gateway connecting subnetworks in the in-vehicle network, or in a domain controller. In this case, the gateway or domain controller can function as an anomaly detection device. This effectively reduces the transfer of an anomalous frame and prevents the effect of the anomalous frame from spreading in the in-vehicle network.

(3) The above embodiments describe no detailed process after the anomaly detection process performed to determine whether an anomalous frame has occurred or a frame is anomalous. A supplementary explanation is provided on an example of using the result of this determination. For example, information included in the header, the value of the payload, the reception time, and the vehicle status at the time of reception of the anomalous frame, hereinafter, at least a part of these information items may also be referred to as the anomalous frame information, may be stored in a log. Moreover, the other ECUs on the in-vehicle network may be notified about the occurrence of the anomalous frame or about the anomalous frame information. Alternatively, an external server may be notified about the occurrence of the anomalous frame or about the anomalous frame information. The driver may be notified, via a user interface of the vehicle, about the occurrence of the anomalous frame on the in-vehicle network or about the anomalous frame information. Moreover, if a gateway or a domain controller includes an anomaly detector, a process may be executed, such as not transferring the anomalous frame or transferring the frame together with information indicating that the frame is anomalous.

(4) In the above embodiment, the anomaly detection ECU performs the series of three anomaly detection processes, which are the individual frame anomaly detection process, the cycle-specific anomaly detection process, and the frame type-specific anomaly detection process. As described above, not all of these anomaly detection processes always need to be performed.

Each of the anomaly detection processes is independently capable of detecting an occurrence of an anomalous frame in the communication network adopting the time-triggered protocol. These three anomaly detection processes are different from each other in the processing load, execution interval, and anomaly detection level. Thus, two or more of these processes may be performed in combination, in accordance with an available resource or a required level of anomaly detection.

For example, only the frame type-specific anomaly detection process may be executed in an initial state. Then, if an occurrence of an anomalous frame is detected by this frame type-specific anomaly detection process, the individual frame anomaly detection process may be performed on a frame having the same name as this anomalous frame. In this case, until the occurrence of the anomalous frame is detected, the anomaly detection process can be performed without increasing the processing load. Then, after the occurrence of the anomalous frame is detected, a more detailed anomaly detection process can also appropriately handle the anomaly. More specifically, both the processing-load reduction and the safety improvement can be achieved.

As another example, if an occurrence of an anomalous frame is detected by the cycle-specific anomaly detection process, a log of a frame transmitted in the cycle having the same number of repeated cycles as the cycle where the anomalous frame is transmitted may be recorded in detail from then on, or this log may be transmitted to an external server from then on. In this case, information used in a detailed analysis performed, as a follow-up or by an external source, on the anomaly detected in the vehicle can be effectively obtained.

(5) Although stored in plain text in the above embodiment, the individual frame rules, the cycle-specific rules, and the frame type-specific rules may be stored in encrypted form.

(6) In the above embodiment, the cycle-specific anomaly detection process (S1005 in FIG. 14) is executed at the start of the cycle. However, the timing of executing the cycle-specific anomaly detection process is not limited to this. For example, the cycle-specific anomaly detection process may be executed in the network idle time that is included at the end of the cycle. In this case, the anomaly detection process is executed while no frame transmission or reception is made in the in-vehicle network. This can keep the processing load of the anomaly detection ECU or the ECU including the anomaly detector from being temporally concentrated. Thus, the capacity demanded of the anomaly detection ECU or the ECU including the anomaly detector can be reduced. Moreover, the cost of constructing a high-security in-vehicle network can be reduced.

(7) Although one reception rule is set for each of the individual frame rules in the above embodiment (see FIG. 10), two or more rules may be set. Moreover, an individual frame rule having no reception rule may be used. For example, a reception rule may be set only for a second type of frame that is of high importance. In this case, the checking can be performed according to importance of the frame, and thus the safety of the in-vehicle network can be effectively enhanced.

(8) Although the individual frame rule of the dynamic frame stores only the reception rule about the vehicle status detected at the time of frame reception in the above embodiment, this is not intended to be limiting. Even for the individual frame rule of the dynamic frame, a rule about the amount of change with respect to the reception value may be set.

(9) In the above embodiment, the individual frame rule of the frame having "1" as the payload preamble indicator is set for each message ID. However, the individual frame rule may be set for each frame name. This can reduce memory required to hold the individual frame rules.

(10) Although the frame names are stored in the authorized-ID list (see FIG. 8) in the above embodiment, the frame names are not essential to the authorized-ID list.

(11) Although one item of one kind is held as the payload information of one frame in the authorized-ID list (see FIG. 8) in the above embodiment, this is not intended to be limiting. One frame may hold two or more kinds of information or a plurality of information items of the same kind. Alternatively, the frame may hold no payload information. When holding a plurality of payload information items, the frame may include information indicating a field (such as position, length, and unit of the field) for each item in the payload segment.

(12) Although the reference ranges included in the cycle-specific rules stored in the cycle-specific rule holder (see FIG. 11) are fixed in the above embodiment, these reference ranges may be variable. The number of dynamic-frame receptions can differ according to the vehicle status. For example, while the vehicle is moving, the boundary values of the reference ranges may be increased (or decreased).

(13) In the above embodiment, each of the cycle-specific anomaly detection process and the frame type-specific anomaly detection process uses the rules to separately evaluate the statistics on the received frame and, if any of the statistics is not satisfied, determine that an occurrence of an anomalous frame is detected. Here, techniques to execute these anomaly detection processes and the rules or data format used in these anomaly detection processes are not intended to be limiting. For example, a classifier, such as a support vector machine, may learn a normal state using the statistics as feature amounts and then determine whether an anomalous frame has occurred. As another example, the statistics may be reduced in dimension using, for example, a principal component analysis method, and then whether an anomalous frame has occurred may be determined using an outlier detection method, such as a local outlier factor. In this case, even if the statistics are within the reference ranges, the anomalous frame can be detected on the basis of the combination of the statistics. This is effective in enhancing the detection performance.

(14) Although the reference ranges for the statistics in the cycle-specific rules and the frame type-specific rules are predetermined in the above embodiment, this is not intended to be limiting. For example, the reference ranges may be set or updated through the learning of a normal state while the vehicle is moving. For example, statistics on frames in a normal state may be learned using data obtained in a predetermined period of time elapsed after the anomaly detection ECU is turned on. This allows the rules to be modified according to a driver, a vehicle type, or a driving environment, and is effective in enhancing the detection accuracy.

(15) In the above embodiment, the reception value stored in the reception history (see FIG. 13A) corresponds to one signal for each frame name. However, a previous reception value and a second previous reception value corresponding to a plurality of signals may be stored. Alternatively, the payload values may be stored as they are.

(16) In the above embodiment, the vehicle status included in the reception history (see FIG. 13A) is either one of the two states, moving or stopped. However, the vehicle status is not limited to these two states. A state that is determinable based on a frame of a corresponding type may be used similarly as in the above example using the aforementioned two states. For example, the vehicle status may indicate an ignition-on state, an accessary-on state, a low-speed moving state, a high-speed moving state, a steering operation status, a gear status, an advanced driver-assistance function on/off state, or a state of any combination of these. Moreover, a reception rule (see FIG. 10) including any combination of these examples of the vehicle status may be used. In particular, a reception rule including a selected vehicle status relating to a design transmission condition of a dynamic frame of a corresponding type allows an anomalous frame to be detected accurately.

(17) In the above embodiment, only the results of the individual frame anomaly detection process, the cycle-specific anomaly detection process, and the frame type-specific anomaly detection process are outputted. However, this is not intended to be limiting. Depending on the process by which an anomalous frame or an occurrence of the anomalous frame is detected, the way an anomaly detection log is stored or a method of handling the anomalous frame may be variable.

For example, information about the frame determined to be anomalous as a result of the individual frame anomaly detection process is stored in a log and, in addition to this, this log may be notified to an external server. If the anomaly detector is included in, for example, a gateway, a process of not transferring this frame may be performed for instance. When the transmission of the anomalous frame can be determined for each frame in this way, making a record of more detailed information enables later analysis of the cause of the attack or a specific handling process such as not using this frame. This is effective in enhancing the safety.

As another example, when the occurrence of the anomalous frame is detected by the cycle-specific anomaly detection process, information about the statistics on the cycle is stored in a log and, in addition to this, this log may be notified to an external server. In this way, the time of occurrence of the attack can be determined for each cycle when the cycle-specific anomaly detection process is performed. This is useful in later analysis of the cause of the attack.

As another example, when the occurrence of the anomalous frame is detected by the frame type-specific anomaly detection process, the statistics are organized for each frame name. Then, a frame having an abnormal statistic is stored in a log and, in addition to this, this log may be notified to an external server. With this, an anomaly that is not detected based on the frame or cycle alone can be detected according to the type of the frame. This allows the cause of the attack to be easily identified when the analysis is performed manually.

(18) Although the frame type-specific rule relates to the statistics on the numbers of receptions for each frame type in the above embodiment, this is not intended to be limiting. For example, the rule may relate to a total amount of change, average amount of change, and dispersion of signal values included in the payload.

(19) Although the cycle-specific rules for both the dynamic frame and the static frame are used in the above embodiment, this is not intended to be limiting. The cycle-specific rules for the static frame may be different from the cycle-specific rules for the dynamic frame. In this case, an occurrence of an anomalous frame can be determined on the basis of both the statistics on the static frame received constantly and the statistics on the dynamic frame received not constantly. This enables more accurate detection.

(20) Although the above embodiments describe the in-vehicle network using the FlexRay protocol, this is not intended to be limiting. For example, CAN, CAN with Flexible Data Rate (CAN-FD), Ethernet (registered trademark), Local Interconnect Network (LIN), or Media Oriented Systems Transport (MOST) may be used. Alternatively, a network implemented by combining any of these networks as subnetworks may be used. This is effective particularly to a network adopting the time-triggered protocol. The above embodiments describe an example of the anomaly detection device or the anomaly detection method in the in-vehicle network. Note that the anomaly detection device and so forth in aspects according to the present disclosure are applicable to communication networks other than in-vehicle networks.

(21) An example of each device according to the above-described embodiments is a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute their functions. Here, the computer program includes combinations of instruction codes for issuing instructions to the computer to execute predetermined functions.

(22) It should also be noted that a part or all of the constituent elements in each of the devices according to the above-described embodiments may be implemented into a single Large Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing each of the constituent elements to execute their functions.

Each of the constituent elements included in each of the above-described devices may be integrated separately, or a part or all of them may be integrated into a single chip.

The system LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used.

Further, when development of a semiconductor technology or another derived technology provides a circuit integration technology which replaces LSI, as a matter of course, functional blocks may be integrated by using this technology. Adaption of biotechnology, for example, is a possibility.

(23) It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(24) The present disclosure may be the above-above described methods. These methods may be a computer program executed by a computer, or digital signals forming the computer program.

The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray® Disc), and a semiconductor memory. The present disclosure may be the digital signals recorded on the recording medium.

The present disclosure may be implemented by transmitting the computer program or the digital signals via an electric communication line, a wired or wireless communication line, a network represented by the Internet, data broadcasting, and the like.

The present disclosure may be a computer system including a microprocessor and a memory. The memory stores the computer program and the microprocessor operates according to the computer program.

It is also possible that the program or the digital signals may be recorded onto the recording medium to be transferred, or may be transmitted via a network or the like, so that the program or the digital signals can be executed by a different independent computer system.

(25) The above-described embodiments and the above-described variations may be combined.

INDUSTRIAL APPLICABILITY

The technology according to the present disclosure is usable for a communication network, particularly for a network adopting the time-triggered protocol, to handle an anomalous frame transmitted by a cyberattack for example.

What is claimed is:

1. An anomaly detection device included in a communication network adopting a time-triggered protocol based on a time slot,
    the communication network including a plurality of communication devices that connect to each other, each of the plurality of communication devices transmitting or receiving one or more frames for each predetermined time slot in a predetermined cycle, the predetermined time slot being one time slot of a plurality of time slots, the predetermined cycle being one cycle of repeated cycles,
    the anomaly detection device comprising:
    a frame receiver that receives the one or more frames; and
    an anomaly detector that detects an occurrence of an anomalous frame in accordance with a number of repeated cycles of each cycle in the plurality of cycles and the each predetermined time slot in which each of the one or more frames is received by the frame receiver,
    wherein the anomaly detector performs the detection by verifying a statistic on the one or more frames against a rule indicating a reference range of the statistic, the one or more frames being received in at least one cycle including the predetermined cycle, each frame of the one or more frames is classified according to a first type, the first type being a type according to meta information included in each frame of the one or more frames, the statistic includes a first statistic on a total number of each type of frames classified according to the first type, in the predetermined cycle, the rule includes a first rule indicating a reference range of the first statistic, and the anomaly detector detects an occurrence of an anomalous frame from among the one or more frames by verifying the first statistic against the first rule.

2. The anomaly detection device according to claim 1, wherein each frame of the one or more frames is classified according to a second type, the second type being a type according to content of a payload of each frame of the one or more frames,
    the statistic includes a second statistic on at least one of: a total number of each type of frames classified according to the second type, in two or more cycles that include the predetermined cycle; and a total number of each type of frames classified according to the first type and the second type, in two or more cycles that include the predetermined cycle,
    the rule includes a second rule indicating a reference range of the second statistic, and
    the anomaly detector detects an occurrence of an anomalous frame by verifying the second statistic against the second rule.

3. The anomaly detection device according to claim 2, wherein when detecting an occurrence of an anomalous frame using one of the first rule and the second rule, the anomaly detector further determines, using an other of the first rule and the second rule, whether the anomalous frame has occurred.

4. The anomaly detection device according to claim 1, wherein when detecting an occurrence of an anomalous frame, the anomaly detector further determines whether each frame of the one or more frames is anomalous.

5. The anomaly detection device according to claim 4, wherein the anomaly detector determines that a frame from among the one or more frames is anomalous when (i) the time slot in which the frame is received is the each predetermined time slot in the predetermined cycle and (ii) a relationship, in which a remainder is 0 if a value obtained by subtracting a predetermined offset value from a value of the number of repeated cycles of the predetermined cycle in which the frame is transmitted is divided by a predetermined cycle reception, is not satisfied.

6. The anomaly detection device according to claim 1, wherein the plurality of time slots included in the plurality of cycles include a dynamic time slot in which a frame is transmitted or received as needed for each of the plurality of cycles, and
    the anomaly detector determines whether a dynamic frame received in the dynamic time slot is anomalous, in accordance with: a vehicle status determined from a frame received before the dynamic frame is received; and information included in the dynamic frame.

7. The anomaly detection device according to claim 6, wherein if the vehicle status is not a predetermined status when the dynamic frame including a number of repeated cycles satisfying a predetermined relationship with a slot identification (ID) of the dynamic frame is received, the anomaly detector determines that the dynamic frame is anomalous.

8. The anomaly detection device according to claim 1, wherein the time-triggered protocol is a predetermined communication protocol,
    the number of repeated cycles refers to a cycle count defined in the predetermined communication protocol, and
    the first statistic includes at least one of: a total number of the one or more frames received; a total number of one or more null frames received; a total number of one or more sync frames received; a total number of one or more startup frames received; a total number of one or more frames each having a payload preamble indicator indicating 1; and a total number of one or more frames received each having an error.

9. An anomaly detection method executed in a communication network adopting a time-triggered protocol based on a time slot, the communication network including a plurality of communication devices that connect to each other, each of the plurality of communication devices transmitting or receiving one or more frames for each predetermined time slot in a predetermined cycle, the predetermined time slot being one time slot of a plurality of time slots, the predetermined cycle being one cycle of repeated cycles, the anomaly detection method comprising:

receiving the one or more frames; and detecting an occurrence of an anomalous frame in accordance with a number of repeated cycles of each cycle in the plurality of cycles and the each predetermined time slot in which each of the one or more frames is received in the receiving, wherein the detecting is performed by verifying a statistic on the one or more frames against a rule indicating a reference range of the statistic, the one or more frames being received in at least one cycle including the predetermined cycle, each frame of the one or more frames is classified according to a first type, the first type being a type according to meta information included in each frame of the one or more frames, the statistic includes a first statistic on a total number of each type of frames classified according to the first type, in the predetermined cycle, the rule including a first rule indicating a reference range of the first statistic, and the detecting includes detecting an occurrence of an anomalous frame from among the one or more frames by verifying the first statistic against the first rule.

* * * * *